US00RE40131E

(19) United States
(12) Reissued Patent
Jones

(10) Patent Number: US RE40,131 E
(45) Date of Reissued Patent: Mar. 4, 2008

(54) STEREOGRAPHIC BOOK

(76) Inventor: Charles W. Jones, P.O. Box 197, Knightstown, IN (US) 46168

(21) Appl. No.: 10/950,224

(22) PCT Filed: Oct. 3, 1997

(86) PCT No.: PCT/US97/18028

§ 371 (c)(1),
(2), (4) Date: Apr. 26, 1999

(87) PCT Pub. No.: WO98/14819

PCT Pub. Date: Apr. 9, 1998

Related U.S. Patent Documents

Reissue of:
(64) Patent No.: 6,456,433
Issued: Sep. 24, 2002
Appl. No.: 09/269,837
Filed: Apr. 26, 1999

U.S. Applications:
(60) Provisional application No. 60/026,761, filed on Oct. 4, 1996, and provisional application No. 60/044,736, filed on Apr. 18, 1997.

(51) Int. Cl.
*G02B 27/22* (2006.01)

(52) U.S. Cl. ..... 359/466; 359/473; 359/474; 359/476

(58) Field of Classification Search ..... 359/471–474, 359/476, 462, 466, 480–48
See application file for complete search history.

(56) References Cited

U.S. PATENT DOCUMENTS

| | | | | | |
|---|---|---|---|---|---|
| 174,893 | A | * | 3/1876 | Bierstadt | 359/474 |
| 262,846 | A | * | 8/1882 | Stevens | 359/473 |
| 472,196 | A | * | 5/1892 | McGrew | 359/474 |
| 1,186,786 | A | * | 6/1916 | Huber et al. | 359/473 |
| 1,520,311 | A | * | 12/1924 | Ruth | 359/473 |
| 2,334,483 | A | * | 11/1943 | Dennis | 359/474 |
| 2,484,591 | A | * | 10/1949 | Rochwite | 359/476 |
| 2,616,333 | A | * | 11/1952 | Tinker | 359/474 |
| 2,683,391 | A | * | 7/1954 | Nichols | 359/467 |
| 2,712,773 | A | * | 7/1955 | Merrick | 359/466 |
| 2,713,773 | A | * | 7/1955 | Merrick | 359/466 |
| 2,849,917 | A | * | 9/1958 | Petri | 359/477 |
| 3,597,041 | A | * | 8/1971 | Frantz et al. | 359/480 |
| 3,980,394 | A | * | 9/1976 | Zapf | 359/473 |
| 4,172,633 | A | * | 10/1979 | Hashimoto et al. | 359/474 |
| 4,549,785 | A | * | 10/1985 | Vitrac | 359/474 |
| 4,726,653 | A | * | 2/1988 | Thaler et al. | 359/467 |
| 4,810,057 | A | * | 3/1989 | Dunkley | 359/478 |
| 4,846,553 | A | * | 7/1989 | Rice | 359/474 |
| 5,000,543 | A | * | 3/1991 | Curtin | 359/474 |
| 5,124,840 | A | * | 6/1992 | Trumbull et al. | 359/472 |
| 5,204,776 | A | * | 4/1993 | Seamans et al. | 359/466 |

(Continued)

FOREIGN PATENT DOCUMENTS

| | | | | | |
|---|---|---|---|---|---|
| JP | 63-8624 | A | * | 1/1988 | 359/466 |

*Primary Examiner*—Mark A. Robinson
*Assistant Examiner*—Lee Fineman
(74) *Attorney, Agent, or Firm*—Baker & Daniels LLP

(57) ABSTRACT

A handheld stereographic book-type device which includes a content support portion (8) configured to position and support stereographic content (1A, 1B), and a stereoscopic viewer (5) configured to enable interocular adjustment. The stereoscopic viewer includes adjustable left and right lenses and respective adjustable occluding apertures to enable perception of stereographic content configured with left and right peripheral monocular fields (FIGS. 7–9, 2DL & 2DR). A viewer pivotal chassis (3) is configured to couple the stereoscopic viewer to the content support portion (8). The viewer pivotal chassis includes a plurality of pivotal axes (3) parallel to a line which bisects the left and right lenses of said viewer to enable the user to visually scan and traverse up and down the length of said content while maintaining focus of said content therewith said viewer (5).

35 Claims, 14 Drawing Sheets

U.S. PATENT DOCUMENTS 5,206,757 A * 4/1993 Cheng et al. ..... 359/480
5,309,280 A * 5/1994 Jones ..... 359/474
5,309,281 A * 5/1994 Rover ..... 359/474
5,499,136 A * 3/1996 Jones ..... 359/474
5,615,046 A * 3/1997 Gilchrist ..... 359/464
5,701,532 A * 12/1997 Inaba ..... 359/473
5,880,884 A * 3/1999 Hauptli ..... 359/482
6,067,192 A * 5/2000 Lichtenfield et al. ..... 359/480

* cited by examiner

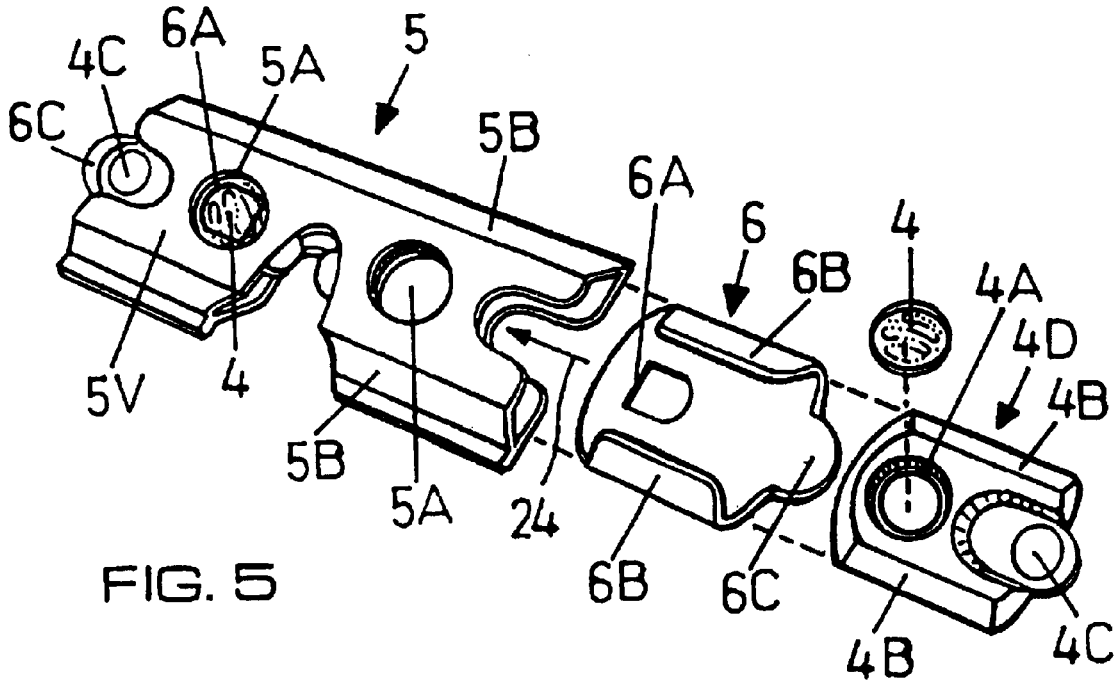
FIG. 5
FIG. 6
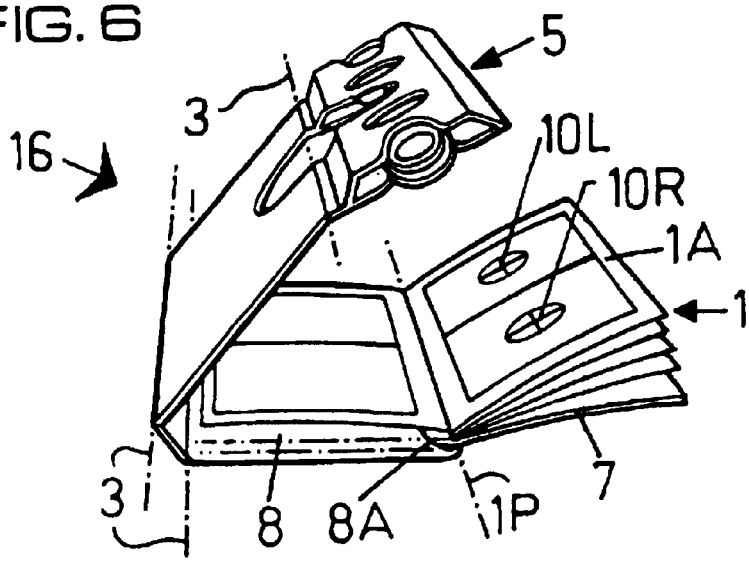

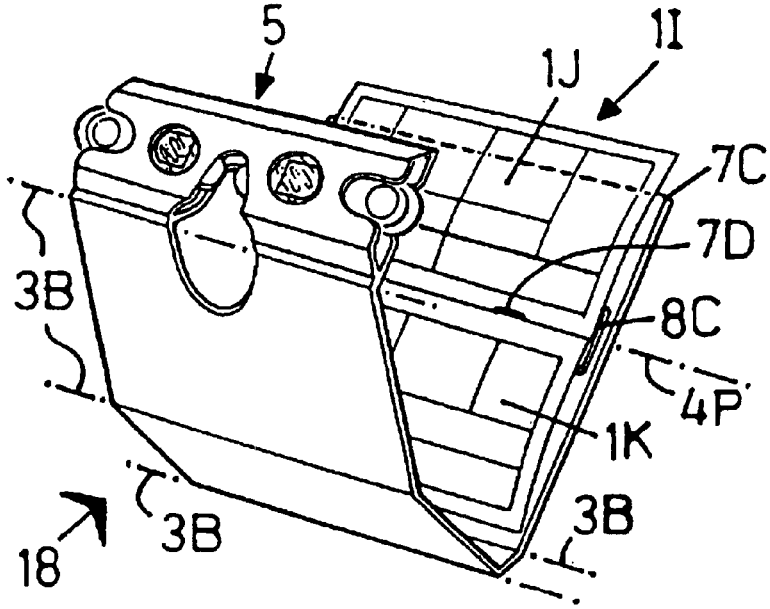
FIG. 21
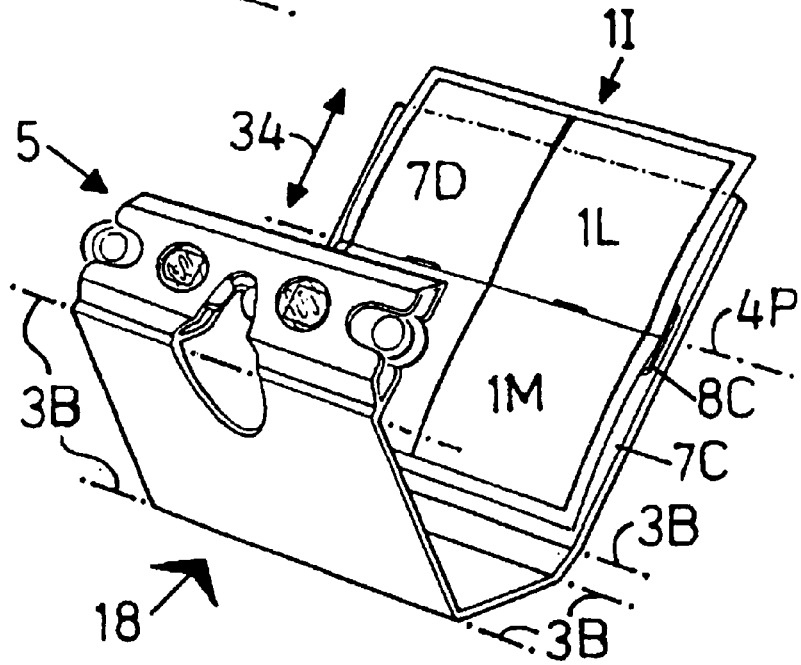
FIG. 22
FIG. 23
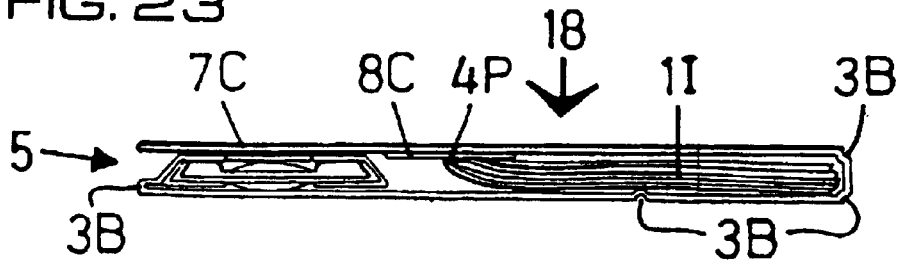

FIG. 24
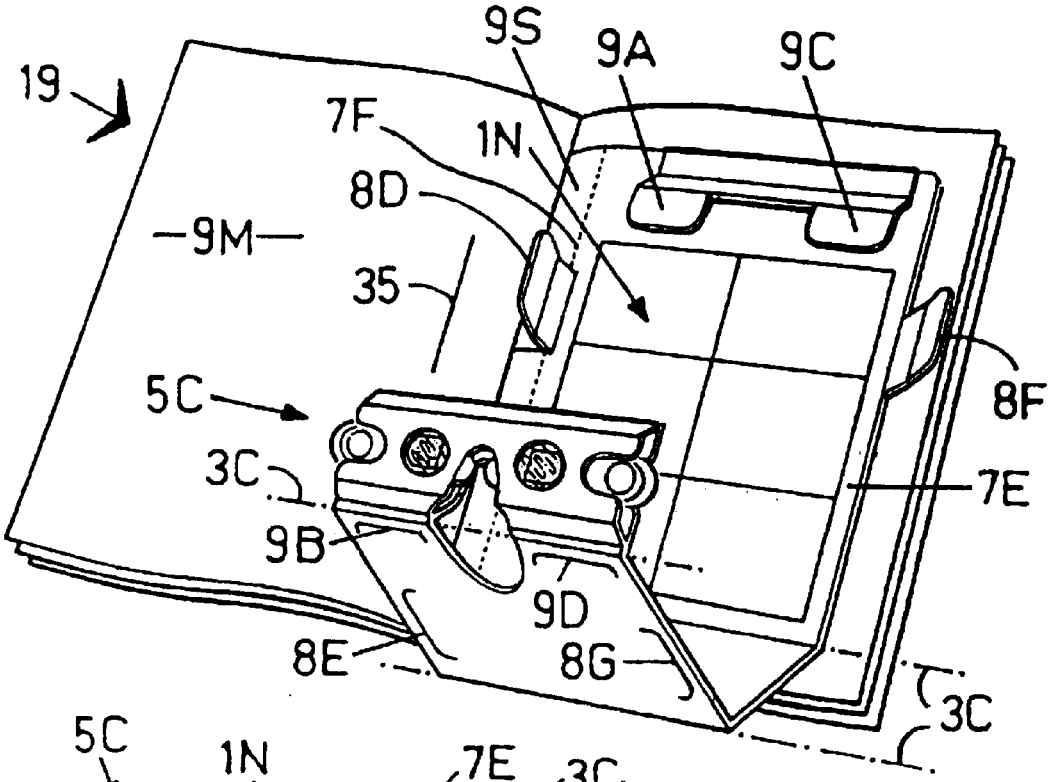
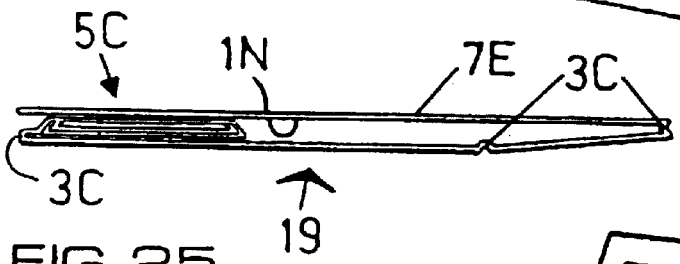
FIG. 25
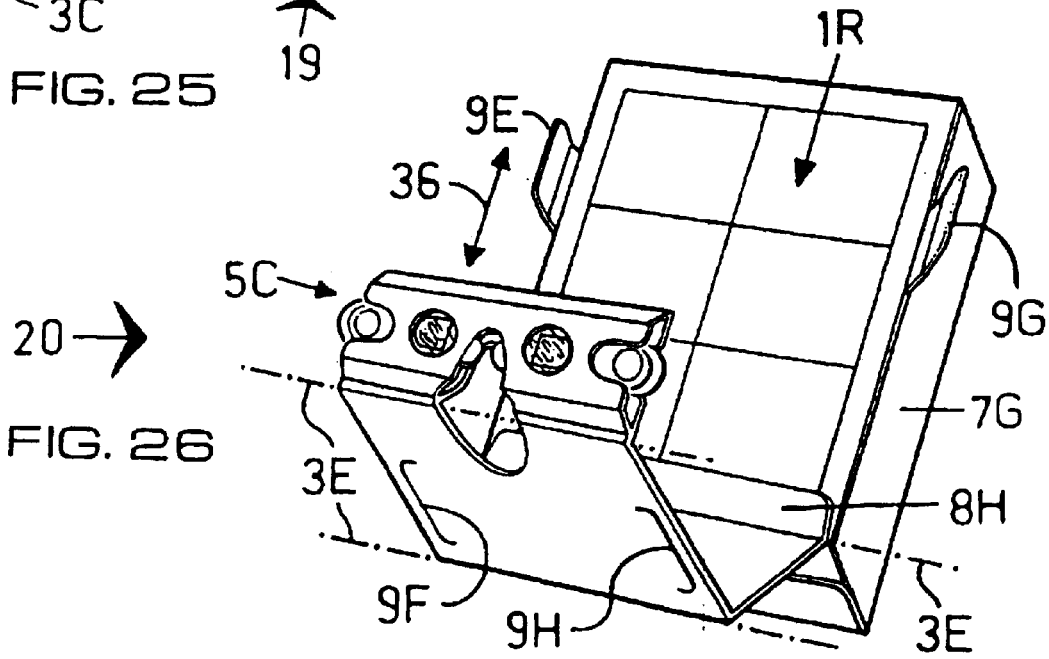
FIG. 26

FIG. 27
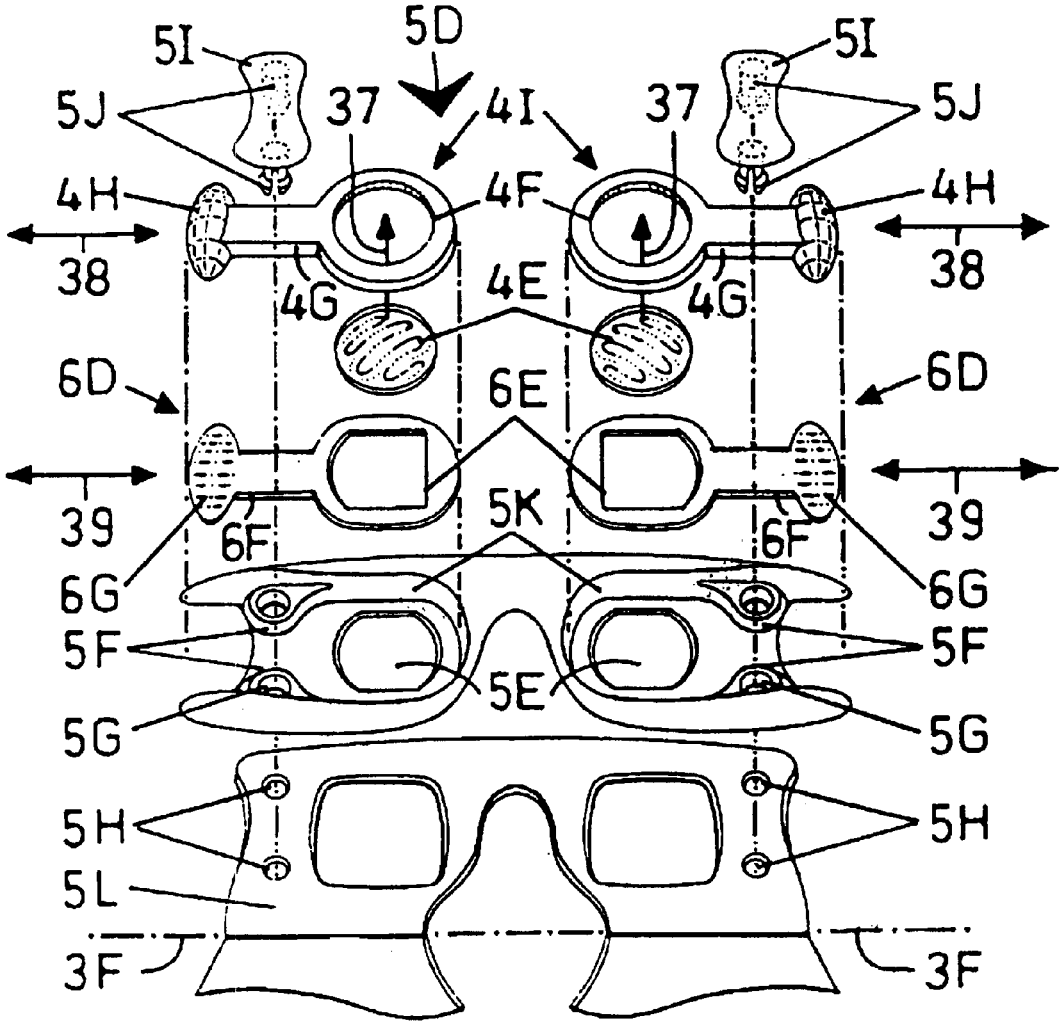
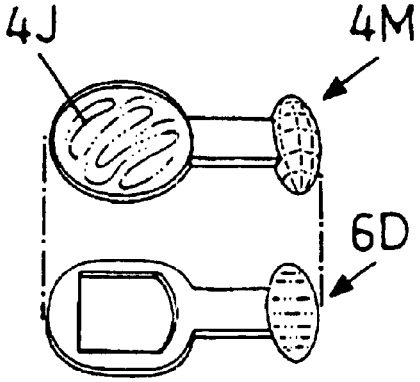
FIG. 28
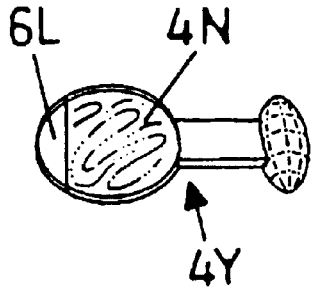
FIG. 29

STEREOGRAPHIC BOOK

Matter enclosed in heavy brackets [ ] appears in the original patent but forms no part of this reissue specification; matter printed in italics indicates the additions made by reissue.

CROSS-REFERENCES TO RELATED APPLICATIONS

This application is a U.S. national application of international application Ser. No. PCT/US97/18028 filed Oct. 3, 1997, which claims priority to U.S. provisional applications Ser. Nos. 60/026,761 and 60/044,736 filed Oct. 4, 1996, and Apr. 18, 1997, respectively.

BACKGROUND AND SUMMARY OF THE INVENTION

The present invention relates to an articulated apparatus which enables stereographic and textual content to be conveyed and presented to the user in a manner similar and related to a book; a brochure; and a format for advertisement and presentation in concert with pre-existing publishing and packaging formats.

The present invention may also be configured with transparent sleeves which operate in a manner similar to a plurality of pivotally-mounted pages, so it may convey stereographic photoprints mounted back-to-back in a manner similar to a photo album.

The present invention can convey high resolution stereographic digital hard copies sent and received via an electronic network, to be printed at the site of reception, and then mounted into the device.

The present invention can be configured to convey stereographic charts and maps to enhance the user's comprehension of geographical and topological features.

More particularly, the present invention as contemplated herein is directed to providing a stereographic device which is very affordable to produce with pre-existing materials and manufacturing techniques extant in the publishing industry, including materials such as cardboard, bristol board, fabric, linen, etc. (with the exception of the lens elements, which are plastic or glass) and with such manufacturing methods as die-cutting, folding, laminating, etc. and other pre-established methods of fastening and page binding, including staple, wire, etc. The present invention can be secured together and also releasably secured into a storage configuration with various printable adhesives, tapes and also tab and slot fastening techniques common to the traditional publishing industry and well known to those skilled in the art. However, the present invention should not be limited to these suggested aspects of material preference and said rendering techniques, as other means may be utilized to render the device in its various configurations.

Stereographic/stereoscopic devices are numerous and various in type and well-known in the art. Generally, a stereoscope is an optical instrument configured to view stereographic imagery. The primary objective of the stereoscopic/stereographic art is to provide the user with a visual medium that approximates the experience of natural human visual perception of three-dimensional space. Depth perception is a phenomenon that naturally occurs as the right and left eyes each perceive simultaneously the spacial world in parallax, from two slightly different, horizontally displaced perspective viewpoints, which the brain fuses together and interprets, providing three-dimensional perception. A stereographic image typically consists of two separate images produces in a flat, planar, two-dimensional medium. The images of corresponding left and right perspective views are appropriately positioned next to each other so that their perspective viewpoints are horizontally displaced from each other by a distance that corresponds to the average inter-pupillary distance of the left and right eyes. The two images, commonly referred to as a stereograph or a stereo-pair, when viewed with an optical viewer possessing two lenses with the appropriate optical and focal properties, enable each eye to see the corresponding image intended for it, thereby creating in the brain a perceived three-dimension effect.

The present invention is designed to take advantage of the high-tech synthesizing power of computer imaging as well as high resolution digital printing to provide an affordable, accessible stenographic book that is capable of communicating complex three-dimensional visual concepts which are accompanied and augmented with textual information. Because of its ability to store and convey both stereographic imagery and readable text, the present invention can be utilized extensively for educational and entertainment purposes. In particular, the present invention is useful for visual novels and children's books, including reading primers, and also as an affordable, take-home visualization tool and study aid in the fields of chemistry, molecular biology, medicine, architecture, artistic sculpture, and other areas which benefit from seeing and understanding complex three-dimensional imagery.

DESCRIPTION OF THE INVENTION

Stereoscopic Viewer

The stereoscopic viewer, including its various adaptations as disclosed herein, has the primary objective of conveying stereographic content to the user. Further, the objective is to simulate natural human vision and to inclusively provide an immersive, full-field-of-view stereographic viewing experience to a wide audience, especially those who do not have access to expensive electronic systems.

One of the key capabilities necessary to achieve this objective is interocular adjustment. The present viewer substantially improves this capability over the previously disclosed and claimed embodiments of this inventor's work as originally filed in U.S. Pat. No. 5,499,136, wherein interocular adjustment was achieved by configuring the lenses to be adjustable to the user's individual interpupillary distance, with occluding apertures in a fixed and integral position in the viewer body, This capability is effective to a certain extent, however, it is determined that remarkably improved perception of the immersive image field can be attained by configuring the apertures which frame the left and right images to also be adjustable, to therewith enable right-stereographic content to be occluded from the left eye viewpoint and left-stereographic content to be occluded from the right-eye viewpoint, respectively.

Further, adjustable occluding apertures greatly improve the user's ability to fine-tune and thus see an immersive visual-field that simulates natural vision, with a central stereo-field bordered by left and right peripheral monocular fields. The apertures' close proximity to the user's eyes renders the perception of the shielding edges of the apertures as a soft blur. This soft blur of occlusion is actually very important, because it blends said stereo and mono fields seamlessly together, to create an immersive visual field.

It is annotated that the viewer of the present invention may be configured with any type of lense optics common to the stereographic art, including but not limited to the double convex, double convex wedge, plano convex, piano convex wedge, anastigmatic and any other optical lense form or arrangement of lense forms which facilitate optical utilization of the stereoscopic viewer.

CHASSIS PIVOTAL GEOMETRIES

The pivotal geometries of the chassis portions designated herein as the viewer pivotal chassis (VPC) achieves a substantial improvement over the previous viewer pivotal array (VPA) geometries disclosed in U.S. Pat. No. 5,499,136, specifically in embodiments 13C, 14D, and 15E of said patent, which are concerned with enabling the device to achieve a first and second viewing position so that two pivotally-exposed stereographic pages may be viewed sequentially. The VPC geometries presently contemplated achieve not only first and second viewing positions, but are also capable of a linear scanning movement between the first and second viewing positions while retaining focus of the two pivotally-exposed pages. This enables stereographic content on said pages to be arranged in new ways, for example, a double-page spread of a single stereographic image can be viewed. This viewing procedure provides a sensation similar to one surveying a space with binoculars, in the aspect that one can roam and traverse up and down the double page spread and the 3D space of the image. This capability cannot be achieved by the VPA geometries of said previous embodiments. The present VPC geometries are substantially different as to function, and also achieve said functional articulation with a greater economy of pivotal movement. Other distinctions between said previously disclosed VPA geometries and the present VPC geometries are:

Specifically, said previous VPA geometries as disclosed in U.S. Pat. No. 5,499,136 in embodiments 13C, 14D, and 15E in FIGS. 29, 30, and 34, 35 respectively, indicates a mid-point pivotal axis which is required to rotate approximately 180° from the first viewing position to the second viewing position. This is easy discernable in said Figs., as the mid-point pivot apex is in an inverse position in the first viewing position and then shifts approximately 180° to an obverse position in the second viewing position. This reciprocal angular shift is repeated as the pages are pivoted and viewed and can be considered appropriate if placed in the context of the preferred materials of plastic and metal, as contemplated in U.S. Pat. No. 5,499,136, where a repeated and high degree of pivotal flex is easily withstood.

However, the embodiments presently contemplated herein are directed towards material preferences and manufacturing techniques that are traditional to the publishing industry, i.e. cardboard and fabric. Said previous VPA geometries as disclosed in U.S. Pat. No. 5,499,136 may rapidly fatigue and damage cardboard and fabric pivotal means, so the present VPC geometries disclosed herein are contemplated as pivotal solutions to these material concerns. However, it should be understood that these stated aspects of material preference do not exclude the application and rendering of these herein disclosed pivotal configurations with other materials and techniques, i.e. the present invention can also be rendered in plastic or metal or other materials.

According to another aspect of distinction, the present VPC geometries disclosed herein do not require a mid-point pivotal axis to rotate 180° as in said previous embodiments. The present VPC geometries do not possess a mid-point pivot and the pivotal axes have been changed so that no pivot apex of the VPC shifts from an inverse to an obverse position. All pivot apexes of the present VPC geometries retain an obverse angular relationship. Further, the present VPC geometries require less pivotal rotation and do not require any pivotal axis to rotate 180°. Thus, pivotal wear is substantially reduced, and the aforesaid linear scanning function is an additional benefit to the present invention. The drawings disclosed herein will provide a corresponding description of these objectives and said geometries.

BRIEF DESCRIPTION OF THE DRAWINGS

A complete understanding of the present invention and other advantages and features thereof may be gained from a consideration of the following description of the preferred embodiments taken in conjunction with the accompanying drawings in which:

FIG. 5 is an exploded view, in perspective, illustrating the various adjustable elements of the stereoscopic viewer 5.

FIG. 6 is an end perspective view of book 16 illustrating a preferred position to place the device on a horizontal surface so the elements of the viewer 5 can be easily adjusted and aligned with the stereographic content alignment targets 10L and 10R.

FIG. 21 is a perspective view of book variation 18 in a first-viewing position, revealing the modifications of the chassis pivotal geometry, the extended content support portion which is adapted to support the pages in a generally common plane, and a schematic diagram of multiple picture areas that may be utilized for creating stereographic comics.

FIG. 22 is a perspective view of book 18 in a second-viewing position, revealing the pivotal articulation of the chassis relative to FIG. 21.

FIG. 23 is an end-elevational view of book 18 in a folded storage configuration.

FIG. 24 is a perspective view of a stereographic magazine insert, brochure 19, which illustrates how the pivotal chassis of the present invention can be adapted to scan or traverse a series of stereographic images arranged on a content support portion consisting of a planar sheet or surface.

FIG. 25 is an end-elevational view illustrating the thin profile of brochure 19 and viewer 5C in a folded configuration.

FIG. 26 is a perspective view of a stereographic packaging adaptation 20, illustrating how the content support portion, pivotal chassis and viewer 5C may be adapted to packaging, such as toy and cereal boxes, or other such packaging as whimsy permits.

FIG. 27 is an exploded front-perspective view of viewer 5D, which is configured with adjustable occluding apertures 6E and lenses 4E.

FIG. 28 is a perspective view of elements 4M and 6D, which are variations of the adjustable lens and occluding aperture elements relative to viewer 5D in FIG. 27.

FIG. 29 is a perspective view of elements 4Y, which integrates the lens 4N and occluding aperture 6L into one unit and is relative to viewer 5D in FIG. 27.

DETAILED DESCRIPTION OF THE DRAWINGS

Figure 1:
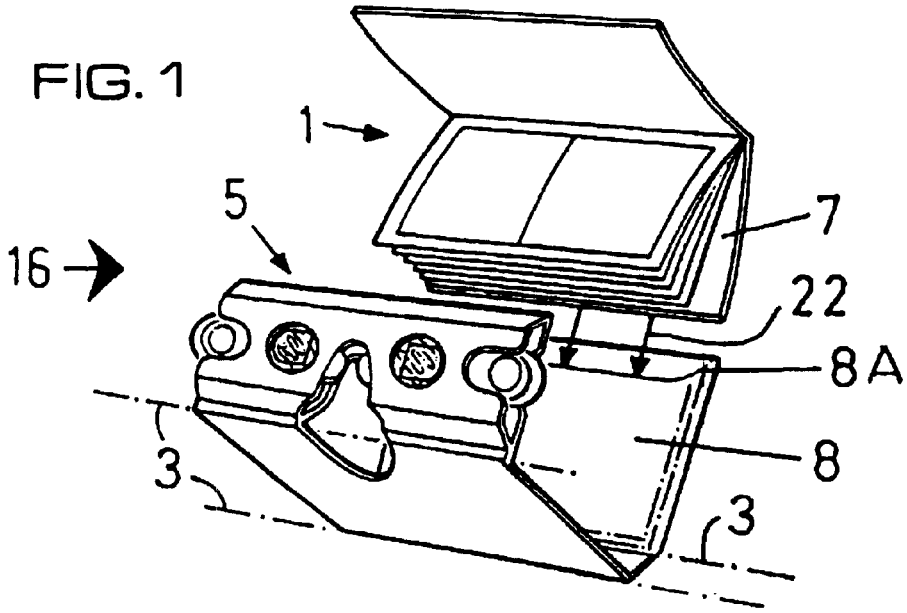
FIG. 1 is a perspective view of stereographic book 16 illustrating the viewer, chassis, page mount/content support portion with a stereographic content packet 1.

Referring to the drawings, FIG. 1 illustrates stereographic book 16 which includes stereoscopic viewer 5. The parallel pivotal axes 3 of the viewer pivotal chassis (VPC) are revealed and pivotally coupled to page mount/content support portion 8 which is configured with sleeve 8A which slidably receives cover 7 of stereographic content packet 1, as indicated by arrows, one of which is designated as 22.

Figure 2:
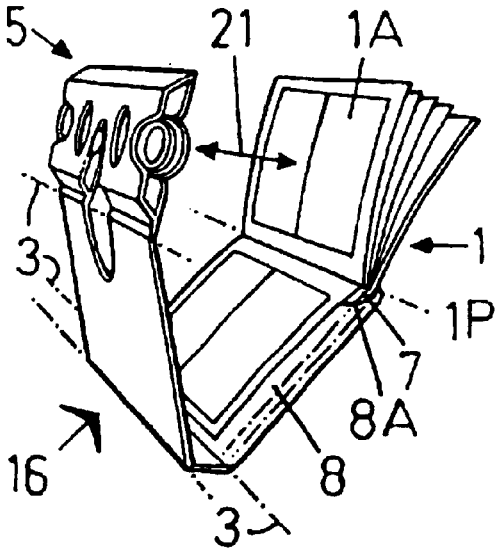
FIG. 2 is a side perspective view of book 16 in a first-viewing position with said content packet place.

FIG. 2 indicates book 16 in a first viewing position, whereby viewer 5 is aligned and focused as indicated by arrow 21 by the user pivoting VPC3 and page surface 1A which is pivoted on axis 1P, which is established and determined by the engagement of cover 7 of content packet 1 therewith sleeve 8A of page mount/content support portion 8.

Figure 3:
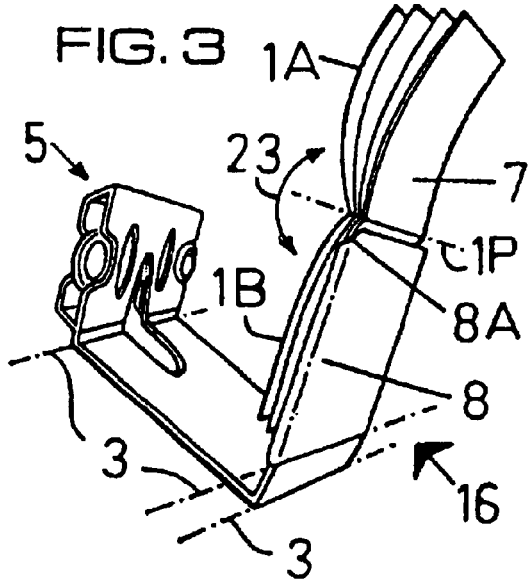
FIG. 3 is a side perspective view of book 16 in a second-viewing position revealing the pivotal articulation of the chassis relative to FIG. 2.

FIG. 3 indicates book 16 in a second viewing position whereby the pivotal articulation of VPC3 has shifted to align viewer 5 with page surface 1B. Arrow 23 indicates that the pivotal rotation of the indicated plurality of pages of content packet 1 can be selectively rotated in either direction. It is understood that the stereographic content on page surfaces 1A and 1B is oriented in an upright position relative to viewer 5.

Figure 4:
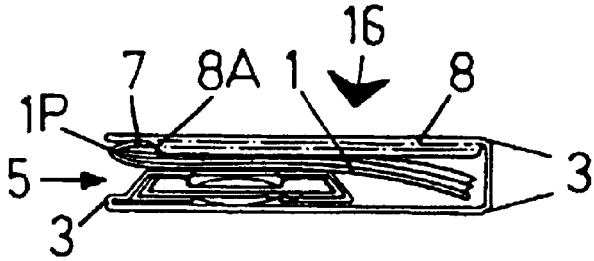
FIG. 4 is an end elevational view of book 16 in a folded storage configuration.

FIG. 4 provides an end elevational view of book 16 which indicates the position of the viewer 5, content packet 1, page mount/content support portion 8 and VPC3 when conformed into a protective storage configuration.

FIG. 5 is an exploded view of viewer 5 which reveals the folded and beveled construction of viewer body 5V which includes apertures 5A. Also revealed are lens elements 4 which may be pre-existing molded plastic or glass. The exploded view reveals how right lens 4 securely engages socketed aperture 4A of lens carriage 4D, configured with bevels 4B to slidably engage occluding aperture plate 6, configured with occluding aperture 6A and corresponding bevels 6B, which also slidably engage bevels 5B of viewer body 5V as indicated by arrow 24. Slidable adjustment of lens carriages 4D and aperture plates 6 is acachieved by the user grasping control tabs 4C and 6C, respectively. It should be understood that lens 4 can be rendered integrally and merged with lens carriage 4D, without changing its ability to be independently adjustable relative to aperture 6. Lens 4 may be configured to be integral and one piece with aperture 6A, however, if these two features are merged, independent adjustment between lens 4 and aperture 6A is lost.

FIG. 6 illustrates book 16 in a horizontal position, preferably resting on a surface, to thereby enable the user to use both hands to adjust and align the lenses and apertures of viewer 5 relative to the schematic targets 10L and 10R on page surface 1A, so that the user's individual optical requirements can be met.

Figure 7:
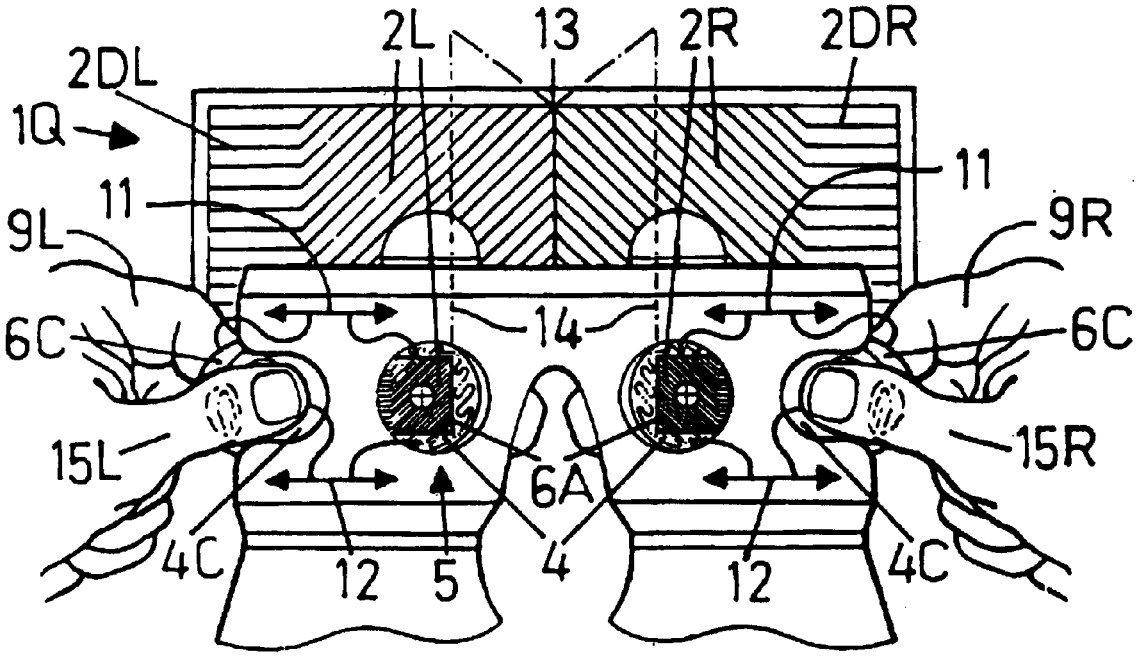
FIG. 7 is a sectional illustration from the point of view of the user, including the fingers of the user, indicating the adjustment and alignment features of the stereoscopic viewer 5 relative to a schematic diagram of the perceptual visual fields of the stereographic content.

FIG. 7 is an illustration from the point of view of the user, including a schematic diagram 1Q indicating the perceptual visual fields which compose the stereographic content to be perceived by the user with viewer 5; said fields 2L and 2R as indicated by the diagonal lines will compose the central stereofield when fused in the brain of the user. The fields 2DL and 2DR, indicated with horizontal lines, will compose the left and right peripheral monocular fields, respectively, after fusion by the user. Centerline 13, where the left 2L field and the right 2R field abut, will be occluded to non-visibility; this is achieved, as represented by dotted line 14, by the user moving index fingers 9L and 9R to slide, as indicated by arrows 11, aperture control tabs 6C and therewith occluding apertures 6A so that said apertures enable each eye of the user to only see the appropriate visual fields intended for it. The procedure for adjusting the lenses of viewer 5 is similar, whereby the user moves thumbs 15L and 15R to slide, as indicated by arrows 12, lens carriage control tabs 4C and therewith lenses 4, until the targets indicated in schematic stereofields 2L and 2R successfully fuse into one target. Thus, inter-pupillary alignment with the stereographic content is achieved. This process is further revealed in FIGS. 8 and 9.

Figure 8:
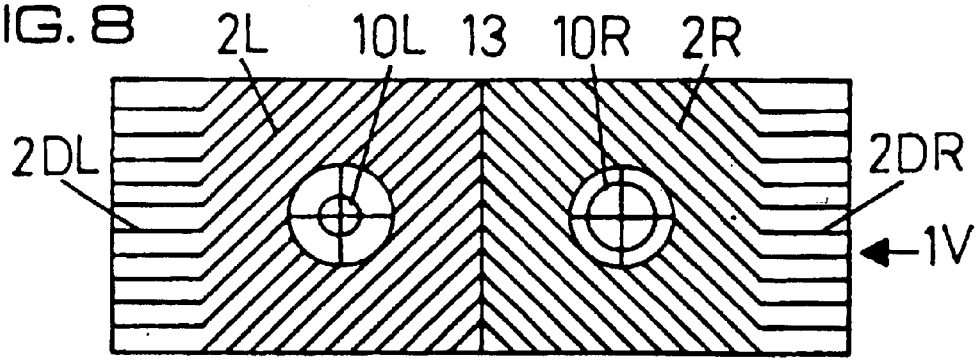
FIG. 8 is a schematic diagram of the perceptual visual fields of stereographic content 1V, before visual field fusion.

FIG. 8 is a schematic diagram which indicates the perceptual visual fields which compose the stereographic content 1V before the event of fusion by the user. Left and right stereofields 2L and 2R are schematically represented by the diagonal lines as indicated, respectively. Alignment targets 10L and 10R are represented with inner circles of a different diameter as indicated. Peripheral monofields 2DL and 2DR are represented by horizontal lines as indicated. Centerline 13 is indicated between stereofields 2L and 2R.

It is annotated that the primary objective of abutting stereofields 2L and 2R is to achieve perception of the largest stereofield possible. If a wide central border were interposed between 2L and 2R, said border would occupy space that can be utilized by the stereographic content and decrease and narrow the perceived stereofield, thus the objective of attaining an immersive visual field would be diminished. However, it should be understood that non-immersive stereographic content can also be conveyed with the present invention, for example, the perceived visual field can convey a series of 3D images, in a manner similar to comics.

Figure 9:
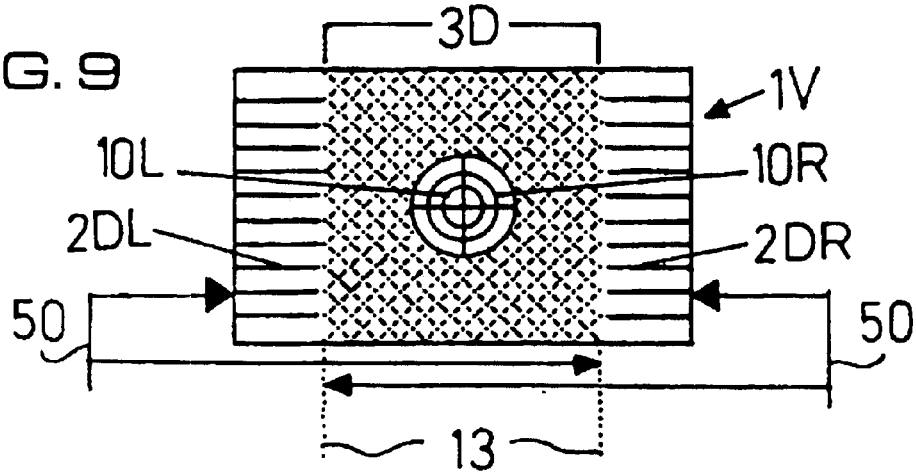
FIG. 9 is a schematic diagram of the perceptual visual fields of stereographic content 1V, after visual field fusion, which corresponds to FIG. 8.

FIG. 9 is a corresponding schematic diagram relative to FIGS. 7 and 8, which indicates stereographic content IV after the event of fusion by the user. Central stereofield 3D is indicated by diagonal dotted lines as bracketed. Central stereofield 3D is composed of stereofields 2L and 2R (refer to FIG. 8) which have fused, as indicated by arrows 50. Alignment targets 10L and 10R have now fused, and the inner circles of different diameters are indicated (refer to FIG. 8). Peripheral monofields 2DL and 2DR are indicated. Centerline 13 is indicated by two dotted lines, and it should be understood that centerline 13 would not be visible if it is successfully occluded. If not properly occluded, centerline 13 would occupy the areas indicated, i.e., centerline 13 would appear as two hard-edged bands containing overlapped stereographic imagery which would not fuse properly, one on each side of stereofield 3D between monofields 2DL and 2DR.

When properly occluded, centerline 13 is blocked out by apertures 6A (See FIG. 7) so that monofields 2DL and 2DR merge with stereofield 3D. This perceptual merging is greatly improved by the close proximity of apertures 6A to the user's eyes, which renders the occluding edge of each aperture 6A as a soft blur, which aids in seamlessly blending the stereofield 3D and monofields 2DL and 2DR together.

When the apertures 6A are adjustable to the user's exact visual requirements said field merging effect is virtually indistinguishable from natural visual perception.

Figure 10:
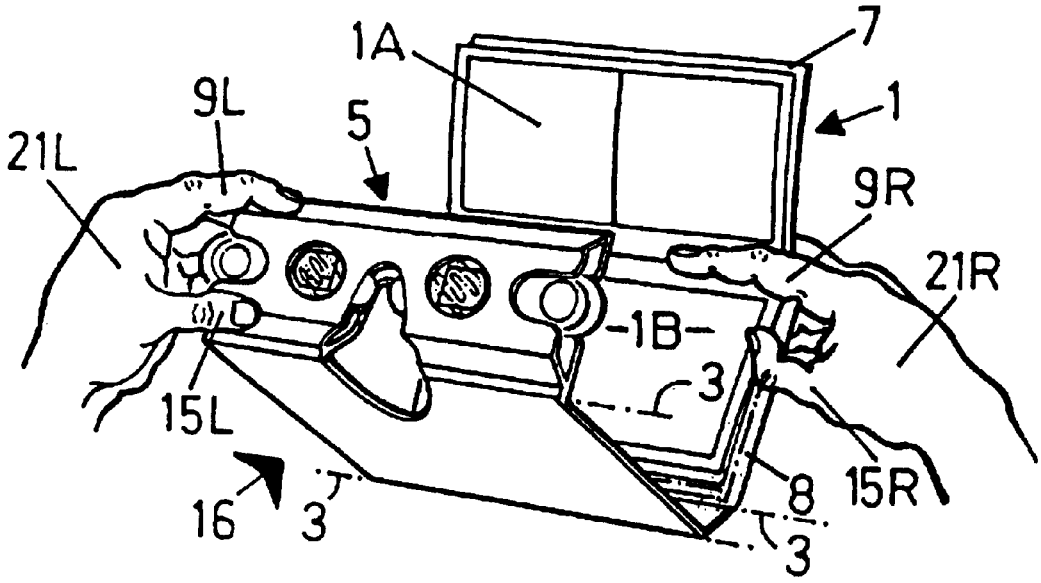
FIG. 10 is a perspective view of book 16 illustrating the method to grasp the device with bands 21L and 21R.

FIG. 10 illustrates in perspective the preferred method of holding the present invention after viewer 5 has been adjusted by the user. Book 16 and viewer pivotal chassis 3 is shown in a second-viewing position, aligned with page 1B after surveying page 1A. Viewer 5 is held by hand 21L and finger 9L and thumb 15L are indicated. Hand 21R is holding page mount/content support portion 8 and securing, with finger 9R and thumb 15R, the plurality of pages of content packet 1 in a viewing position. Note how finger 9R can keep the page surfaces 1A and 1B in position, i.e., spread apart from each other and in a fairly general focal plane which can be intuitively manipulated by the user. It is understood that hand 21L could hold said content packet 1 and hand 21R could hold viewer 5.

Figure 11:
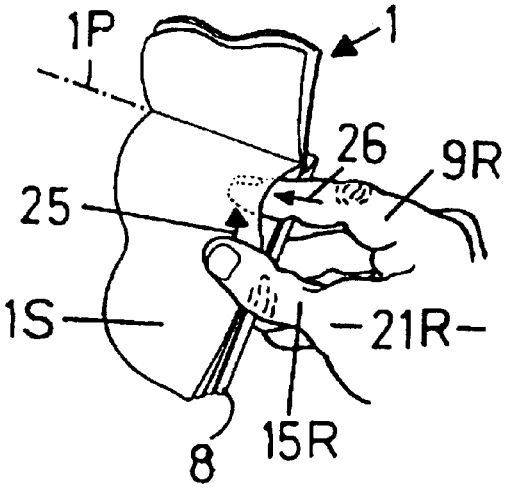
FIG. 11 is a perspective sectional view of said content packet 1 and page mount/content support portion 8 with a user's fingers portrayed in a page-turning procedure.
Figure 12:
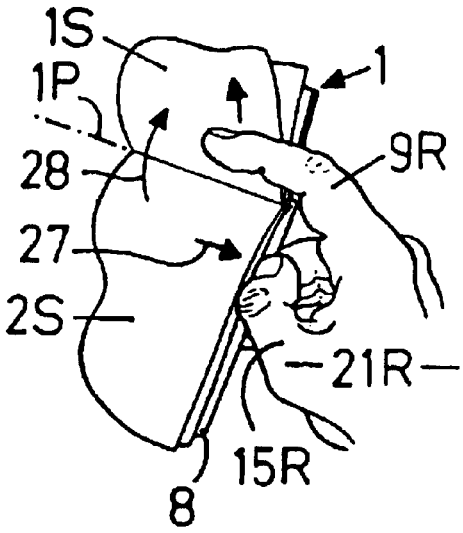
FIG. 12 is a perspective sectional view that corresponds with FIG. 11 to portray a page-turning procedure.

FIG. 11 relates to FIG. 10 and directly corresponds to FIG. 12 and is a perspective sectional view of content packet 1 and page mount/content support portion 8 being held by hand 21R with thumb 15R and finger 9R turning page 1S whereby arrow 25 indicates the motion of thumb 15R creating a curl in page 1S. Index finger 9R is portrayed as inserted as indicated by arrow 26 under said curl.

FIG. 12 continues correspondence with the FIG. 11 page turning procedure, whereby thumb 15R has pulled back as indicated by arrow 27 thereby releasing page 1S, and index finger 9R has flipped page 1S in the direction indicated by arrow 28, thereby pivoting page 1S on pivotal axis 1P into a first-viewing position. Page 2S is revealed in a second-viewing position.

Figure 13:
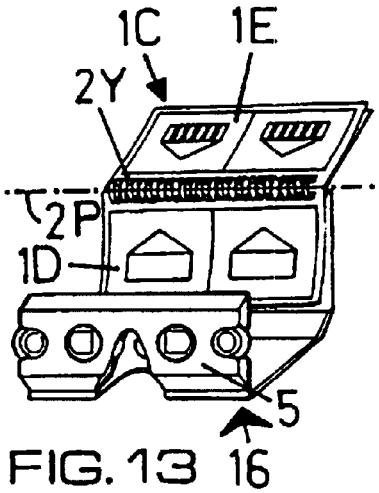
FIG. 13–17 are corresponding perspective views of book 16 illustrating in sequential steps how content packet 1C can be utilized.

FIGS. 13 through 17 illustrate therewith corresponding perspective views of books 16 a sequential procedure for utilizing content packet 1C, which is a plurality of pages wire-bound with a conventional, well-known binding, 2Y. Page 1D and 1E are shown with schematic symbols to diagram the orientation of the stereographic content, whereby the arrows of 1D are pointing upward towards page pivotal axis 2P and the striped arrows of 1E are also oriented towards said axis 2P. FIG. 13 indicates viewer 5 in alignment to view 1D, which is oriented correctly. It is understood that a plurality of pages can be pivotally-exposed and the stereographic content therewith would be oriented said same as indicated by 1D, and that viewer 5 would enable the user to view said pages in sequence.

Figure 14:
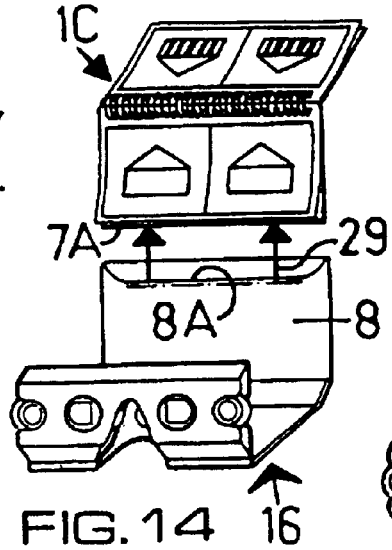

FIG. 14 shows the cover 7A of content packet 1C being slidably released from sleeve 8A of page mount/content support portion 8 as indicated by two arrows, one of which is designated as 29.

Figure 15:
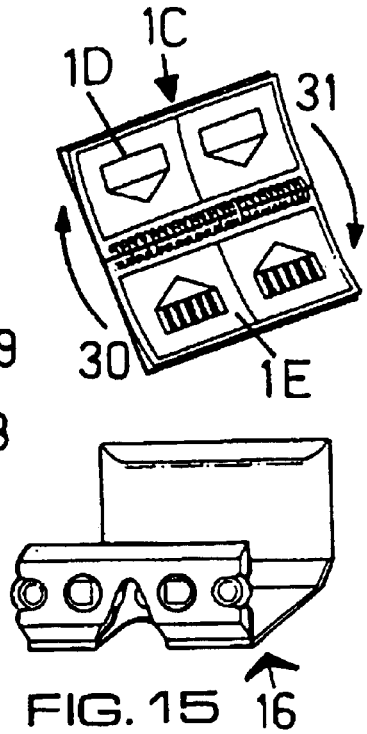

FIG. 15 portrays content packet 1C being reoriented as indicated by arrows 30 and 31, so that page 1E is approaching upright orientation relative to book 16.

Figure 16:
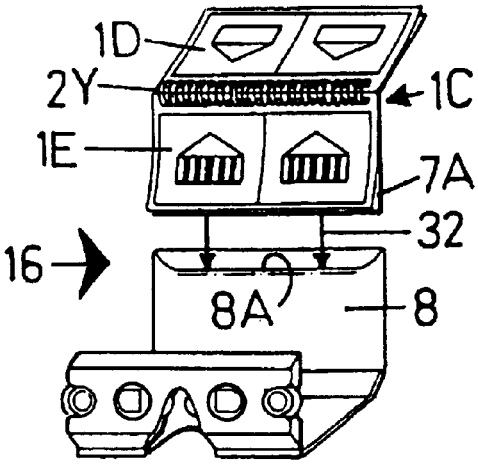

FIG. 16 illustrates 1C approaching, as indicated by arrow 32, slidable engagement with sleeve 8A of page mount/content support portion 8 of book 16.

Figure 17:
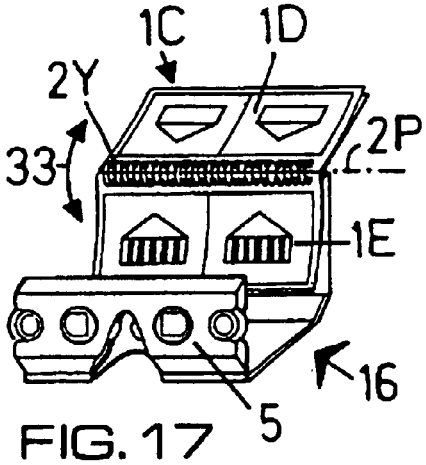

FIG. 17 portrays content packet 1C in place so that the stereographic content as diagramed with 1E can be pivoted on page axis 2P as indicated by arrow 33, and viewed in an upright orientation with viewer 5. It is understood that the content diagrammed on the page surface 1D is arrayed on the opposite side of the page surface diagrammed as 1E.

Figure 18:
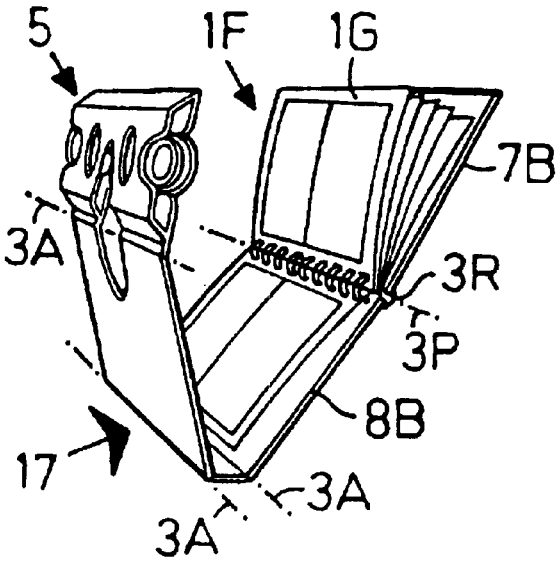
FIG. 18 is a side perspective view of book variation 17 in a first-viewing position.

FIG. 18 is a side perspective view of book variation 17 in a first-viewing position to view page 16, illustrating an adaptation of the pages 1F, pivotable page support surface/cover 7B and page mount/content support portion 8B to a traditional wire-bound format, 3R. It is understood that pages 1F would not be removable with this adaptation. Viewer 5 is unchanged from previous Figs. The VPC3A pivotal geometry is virtually identical to previous VPC3 geometry herein.

Figure 19:
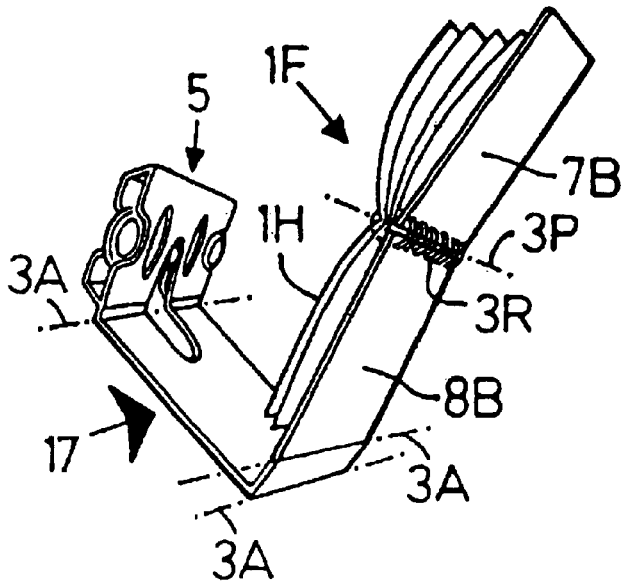
FIG. 19 is a side perspective view of book 17 in a second-viewing position, revealing the pivotal articulation of the chassis relative to FIG. 18.

FIG. 19 illustrates book variation 17 in a second-viewing position to view page 1H. Wire-binder 3R establishes page pivotal axis 3P.

Figure 20:
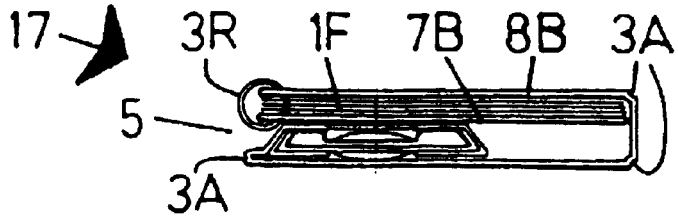
FIG. 20 is an end-elevational view of book 17 in a folded storage configuration.

FIG. 20 is an end elevational view of book 17, indicating the position of the various components in a storage configuration. Wire-binder 3R is evident and cover 7B is indicated in proximity with viewer 5.

FIG. 21 is a perspective view of book variation 18 in a first-viewing position, whereby viewer 5 is aligned to enable the user to view page surface 1J of content packet 1I which is a plurality of pages bound with conventional stapling means 7D to mounting strip 8C which can be affixed to cover/content support portion 7C with a variety of means, such as adhesives or tab and slot techniques common in the art, to determine page pivotal axis 4P. The viewer pivotal chassis axes 3B are clearly indicated, as is the obverse pivotal geometry of said VPC, whereby all angular apexes of said VPC3B are pointed outward in an externally-oriented conformation. Viewer 5 is unchanged relative to previous Figs.

Page 1J and 1K are supported in a generally common plane by extended and rigid cover/content support portion 7C, and are shown with a diagram of multiple stereographic panels as a suggestion to how said pages may convey stereographic comics. As previously stated herein (refer to description of FIG. 8) such an arrangement of stereographic content would be non-immersive, but it could still be fun to view.

FIG. 22 corresponds to FIG. 21, indicating book 18 in a second-viewing position. Viewer 5 can retain focus and vertically scan and traverse page surfaces 1L and 1M respectively, as indicated by arrow 34. Pages 1L and 1M are illustrated to indicate that a single vertical image may be arranged therewith said page surfaces, so that viewer 5 may be utilized by the user to rove over the double-page spread. This would be very appropriate for viewing. stereographic topological surface maps, or for surveying the topology of a pretty girl in bathing suit.

FIG. 23 is an end elevational view of book 18 in a folded storage configuration. The extension of cover 7C is visible, as is the placement of the pivotal axes of VPC3B. Viewer 5 is said same.

FIG. 24 is a perspective view of a stereographic publication insert, brochure 19, which illustrates how the means of the present invention can be adapted to such an objective.

Whereby publication 9M (pictured here as a magazine, however, the brochure 19 may be inserted into other publishing formats) is attached thereto planar sheet/content support portion 7E with any number of well-known and conventional means thereto 9S, and may also be removed from publication 9M by common means, an example of which is illustrated here as perforated line 7F. Also indicated are suggested corresponding configurations for releasably securing viewer 5C and VPC3C into a flat configuration parallel therewith planar sheet 7E, whereby when so conformed, tab 8D engages slot 8E, tab 8F engages slot 8G, tab 9A engages slot 9B and tab 9C engages 9D in a fastening manner commonly known in the art. It is annotated that these suggested and indicated fastening means, methods, and typical locations of engagement are simply a few of a myriad of ways the present invention can be releasably fastened to achieve the objective of said flat configuration.

Viewer 5C is functionally the same as viewer 5, except that it is thinner in profile, and is pivotably coupled to VPC3C which is very similar in function to VPC3B pivotal geometry of book 18 shown in FIGS. 21–23, whereby viewer 5C can easily scan and traverse a series of stereographic images as indicated therewith 1N, while maintaining focus, with proper manipulation by the user in the direction indicated by arrow 35.

It should be understood that an additional purpose for this particular FIG. 24 configuration, other than functioning as a brochure/insert, can be anticipated. For example, planar sheet/content support portion 7E may also be configured to function as a planar mounting surface similar to a common clipboard, to which flat sheets of stereographic content can be aligned and releasably fastened for viewing.

It should be understood that planar sheet/content support portion 7E may also be easily configured with a plurality of pivotable pages in a manner similar to that illustrated in FIGS. 21–23.

FIG. 25 is an end elevational view of brochure 19 illustrating the thin profile of brochure 19 and viewer 5C in a folded configuration with sheet 7E.

FIG. 26 is a perspective view of a stereographic packaging adaptation, 20, illustrating how the means of the present invention may be adapted to such a purpose, to enliven packaging with 3D viewing.

Whereby stereographic content 1R is either integral or affixed to package 7G, and VPC3E is, in the example shown here, attached thereto package 7G by glued flap 8H. A suggested example is indicated of releasably fastening viewer 5C and VPC3E into a flat configuration, parallel to the plane defined by 1R, wherein tab 9E engages slot 9F, and tab 9G engages slot 9H. It is understood that VPC3E and viewer 5C function in the same manner as previously disclosed FIGS. 21–25.

FIG. 27 is an exploded, sectional, front-perspective view of stereoscopic viewer 5D, which is configured with adjustable occluding aperture units 6D and adjustable lens units 4I, and is adaptable to all the embodiments contemplated herein and additionally useful and applicable to the present invention should it be rendered in plastic or metal, as viewer SD would be more durable. Also, viewer 5D would be applicable to linen/hardcover renditions of the embodiments 16, 17, and 18, whereby the entire arrangement of the viewer 5D components can snap thereon to cardboard chassis plate 5L that includes pivotal axis 3F, therewith holes 5H which are of a diameter to securely engage the snap studs 5J of bridgepiece 5I, said studs 5J also engage viewer body holes 5G, two of which are indicated. Lenses 4E engage into snap rim 4F as indicated by arrow 37. The aperture units 6D and lens units 4I nest together in a parallel plane in viewer eyepiece wells 5K so that lenses 4E, apertures 6E are adjustably aligned with viewer apertures 5E. The beveled surfaces 4G and 6F of the lens units 4I and aperture units 6D, respectively, slidably fit in the channel indicated by 5F. Adjustment handles 4H of lens units 4I slidably contact surface 6G. When snapped into place, lens units 4I and aperture units 6D independently slide in the direction indicated by arrows 38 and 39, respectively.

It should be understood that said apertures and lenses in all the embodiments disclosed may be configured with other means to achieve the stated objectives of the present invention, and that, for example, the apertures could be arranged on the opposite side of the lenses so that they are closer to the user's eyes than said lenses.

FIG. 28 is an exploded view, in perspective, of one of the two lens units 4M and aperture units 6D which correspond to viewer 5D in FIG. 27, whereby the configuration of lens 4J and unit 4M are integral and merged into one piece.

Said units fit and function in the viewer 5D in the same manner as units 4I and 6D described in FIG. 27.

FIG. 29 is a perspective view of one of two lens/aperture elements 4Y, which integrates lens 4N with occluding aperture 6L to form one adjustable piece which fits into viewer 5D of FIG. 27 to fulfill the functions of a lens unit 4I and aperture unit 6D. However, it is understood that this configuration does not enable independent adjustment between said lenses and apertures.

Figure 30:
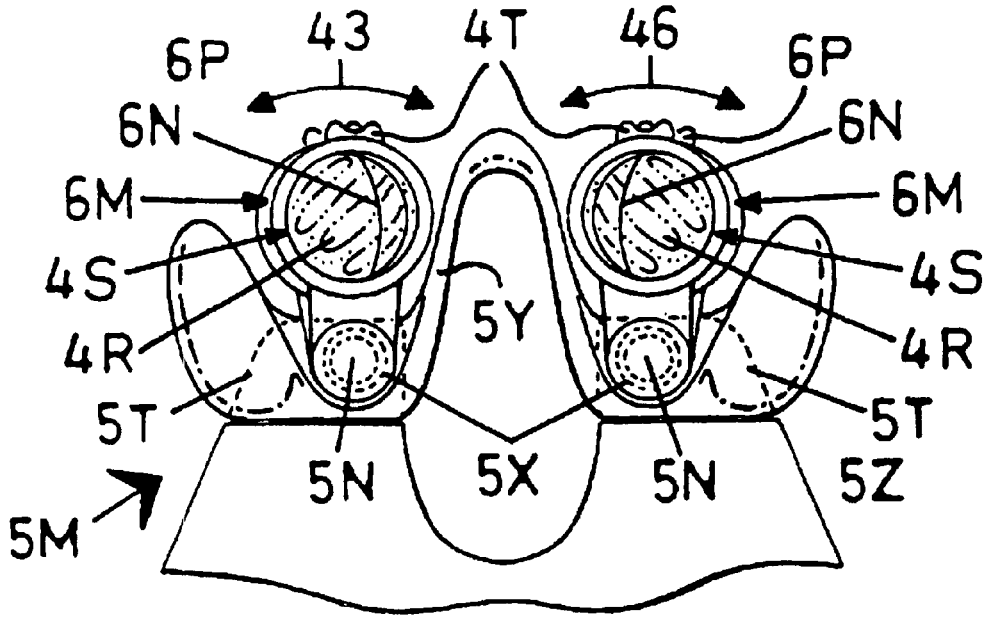
FIG. 30 is a front view of viewer 5M, which utilizes pivotal means to achieve interocular adjustment.

FIG. 30 is a front elevational, sectional view of stereoscopic viewer 5M, which is adaptable to the present invention, and utilizes pivotal means to achieve adjustment of the lenses 4R and occluding apertures 6N, whereby the entire arrangement of viewer 5M components engage mounting plate 5T therewith mounting holes, one of which is indicated as 5Z, which are of a diameter to secure snap-studs 5N, which also engage and secure viewer body 5Y, therewith mounting holes, one of which is indicated as 5X. Snap-studs 5N also pivotally couple lens units 4S and aperture units 6M together so they may pivot about axes determined by mounting holes 5Z, 5X, and stud 5N in the directions indicated by arrows 43 and 46. Pivotal adjustment of lenses 4R and apertures 6N is achieved by the user utilizing the index fingers to nudge switches 4T and 6P, respectively.

Figure 31:
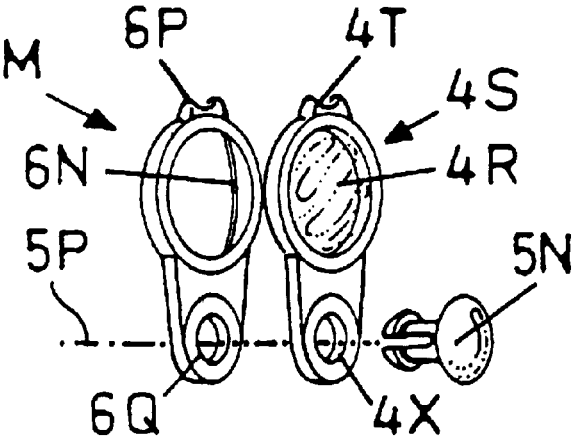
FIG. 31 is an exploded view, in perspective, of elements 6M, 4S and 5N relative to viewer 5M in FIG. 30.

FIG. 31 is an exploded view, in perspective, which relates to viewer 5M of FIG. 30, whereby one snap-stud 5N is indicated, as arc pivotal collars 6Q and 4X, of left aperture unit 6M and lens unit 4S, respectively. Pivotal axis 5P is indicated as common to said components.

Figure 32:
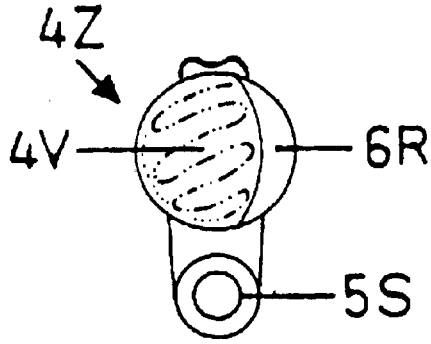
FIG. 32 is a front view of element 4Z, which integrates the lens 4V and occluding aperture 6R into one unit, relative to viewer 5M in FIG. 30.

FIG. 32 is a front elevational view of a left integral lens/aperture unit, 4Z, which can be utilized therewith viewer 5M of FIG. 30, whereby the lens 4V is merged and molded in one piece with occluding aperture 6R and pivotal collar 5S.

Figure 33:
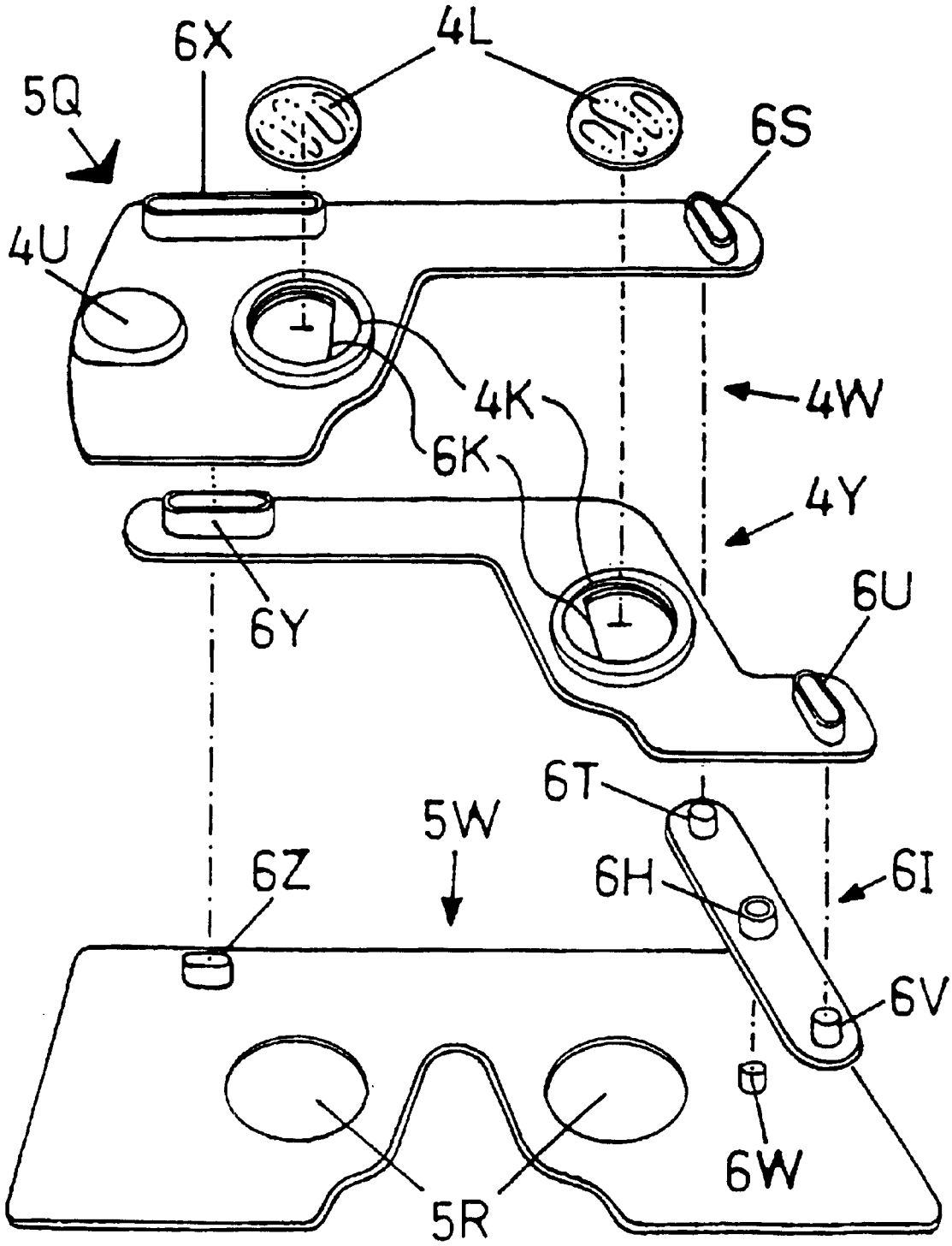
FIG. 33 is a frontal exploded view, in perspective, of interocular adjustment mechanism 5Q, which enables the lenses and occluding apertures to be adjusted in a synchronized manner by the user.

FIG. 33 is a frontal exploded view of interocular adjustment mechanism 5Q, which enables a synchronous adjustment of the eyepieces. It is annotated that the mechanism 5Q does not enable independent adjustment between the lenses and occluding apertures; however, 5Q does allow interocular adjustment to be quickly achieved by the novice stereographic book user. The mechanism depicted is configured to be mounted within a cardboard viewer body as previously shown (see FIG. 5, No. 5V), which is omitted here for purposes of clarity. The components depicted are fabricated of thin, vacuum formed and die-cut plastic, except for the lenses 4Q, which may be pre-existing injection molded plastic or glass. The components of 5Q are basically thin plastic membranes, rendered in a manner familiar to those skilled in the art. It should be understood that the components of 5Q could also be fashioned of injected-molded plastic, cardboard with rivet pivots, or stamped and die-cut aluminum. Mechanism 5Q as shown is extremely cost-effective to produce and reasonably durable.

FIG. 33 indicates how lenses 4L snap into lens sockets 4K which are diecut to form integral occluding apertures 6K which are positioned on lens carriage elements 4W and 4Y, respectively. It is understood that lenses 4L could be merged and formed integrally with said carriage elements via injection-molding. Carriage element 4W includes thumb-switch 4U which indicates a typical location the user would grasp the mechanism 5Q, between the left thumb and forefinger. Carriage element 4W also includes stabilizing channel 6X the concave underside of which slidably fits over the convex upperside of stabilizing channel 6Y of carriage unit 4Y in a manner similar to nesting cups; thus, channel 6Y then also slidably fits over stabilizing alignment pin 6Z, formed on base plate 5W. This same nesting/fitting technique is also evident in the assembly of pivotal sockets 6S and 6U of carriage units 4W and 4Y to pivotal arm pins 6T and 6V respectively, located on pivotal arm 61, which in turn, fits similarly via fulcrum pivotal socket 6H to fulcrum pin 6W, formed on base plate 5W, which also includes die-cut eyepiece apertures 5R. It is annotated that base plate 5W is aligned and secured with any number of typical fastening techniques within a viewer body such as 5V of FIG. 5. However, it should be understood that there are many other means to establish a fulcrum or stabilize the simple pivotal geometry of mechanism 5Q which may not require a base plate such as 5W. Base plate 5W is depicted for reasons of graphic clarity.

Figure 34:
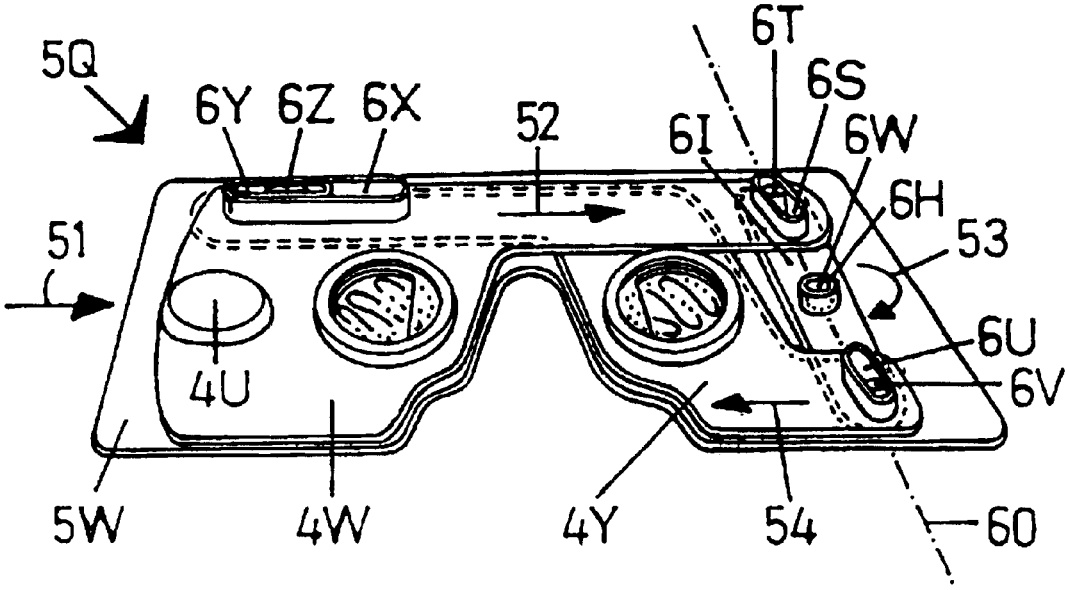
FIG. 34 is a frontal perspective view of mechanism 5Q, showing the components assembled and indicating the directional motion of the components when the mechanism is being adjusted to accommodate a user with narrow-set eyes.

FIG. 34 depicts mechanism 5Q assembled and illustrates the directional motion of the components to adjust the eyepieces to a narrow eye setting, whereby thumb switch 4U is slid in the direction indicated by arrow 51, sliding carriage unit 4W and thus pivotal socket 6S in the same direction as arrow 52; pivotal socket 6S, which engages pivotal arm pin 6T, causing pivotal arm 6I to pivot via fulcrum pivotal socket 6H and fulcrum pin 6W in a clockwise movement as indicated by arrow 53; thus moving pivotal arm pin 6V, which engages pivotal socket 6U, causing carriage 4Y to slide in the direction indicated by arrow 54. Nested stabilizing channels 6X and 6Y and stabilizing alignment pin 6Z are indicated and it is annotated that they may serve to maintain carriages 4W and 4Y in slidable alignment and also serve as a means of stopping or limiting the distance of carriage travel to an appropriate interocular adjustment range. It should be understood that this function can be achieved by other alternative means, and that the present invention is not limited to this specific depicted configuration.

Figure 35:
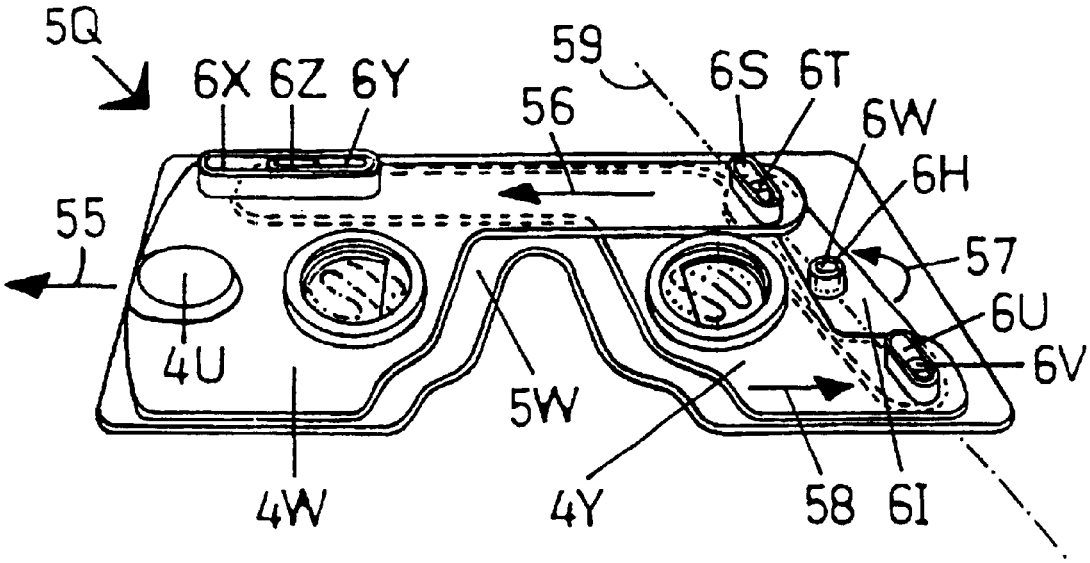
FIG. 35 is a frontal view which closely corresponds to FIG. 34, and indicates the directional motion of the components when the mechanism is being adjusted to accommodate a user with wide-set eyes.

FIG. 35 is a perspective view of mechanism 5Q from an identical point of view as FIG. 34, so the two Figs. can be quickly compared. FIG. 35 indicates the directional motion of the components of 5Q when it is adjusted for a wide eye setting. Arrows 55 through 58 basically indicate the same movement of the said same components as in FIG. 34 in the opposite direction. The angle of pivotal arm 61 can be seen to be stopped in a different position relative to its position in FIG. 34. This angular difference can be seen by comparing line 59 of FIG. 35 to line 60 of FIG. 34.

Figure 36:
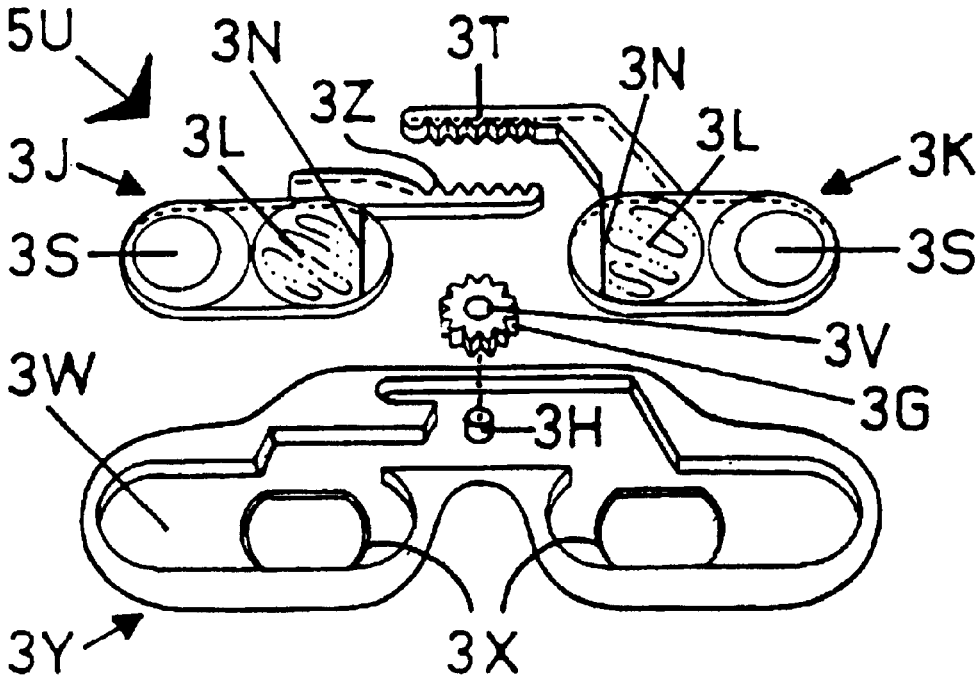
FIG. 36 is a frontal exploded view, in perspective, of mechanism 5U, a means to achieve synchronous interocular adjustment with a simple arrangement of gears.

FIG. 36 illustrates yet another simple means to achieve synchronized interocular adjustment, whereby the lenses and occluding apertures are moved away or towards each other in concert by utilizing a pinion gear meshed with opposing linear gears. Exploded perspective FIG. 36 illustrates mechanism 5U, whereby clear, injection-molded eyepiece components 3J and 3K, which each are configured with lens 3L, integral occluding aperture 3N, and thumb switch 3S slidably fit into eyepiece well 3W of viewer body 3Y, which is configured with eyepiece apertures 3X and gear pivot pin 3H, which receives gear sleeve 3V of pinion gear 3G so that pinion gear 3G rotates freely in either direction, and meshes with opposing linear gears 3Z and 3T of eyepieces 3J and 3K, respectively. It is annotated that these designated components can be pivotally and slidably secured into place by any number of typical methods, for example, a capping shell which would nest over viewer body 3Y and thus maintain said movable components in the eyepiece well 3W. Also, as illustrated in FIG. 27, viewer body 3Y can be secured to a viewer pivotal chassis (or formed integrally with said same) with any number of techniques. FIG. 36 is mainly concerned with revealing mechanism 5U.

Figure 37:
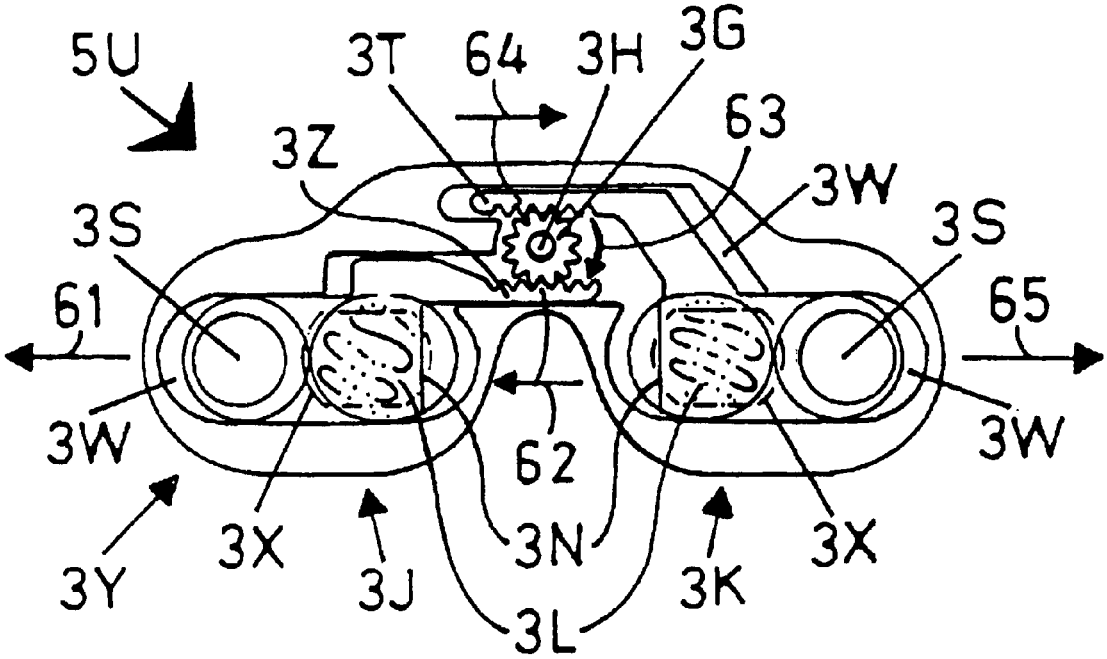
FIG. 37 is a front elevational view of mechanism 5U which indicates the directional motion of the components during said adjustment.

FIG. 37 is a front elevational view of mechanism 5U which corresponds with FIG. 36, and portrays the assembled components and the directional motion of said components as they are adjusted to accommodate a user with wide-set eyes. It is understood that the basic mechanical directions and motions portrayed in FIG. 37 can also occur in the opposite directions as indicated so as to achieve interocular adjustment for a narrow eye-setting.

A wide interocular adjustment is achieved when the user grasps eyepiece thumb switch 3S and slides it outward as indicated by arrows 61 and 65. It is understood that the user may grasp either the left or right thumb switch. For this sequential example, the user slides the left switch 3S in the direction indicated by arrow 61, which causes linear gear 3Z to also slide, as indicated by arrow 62, which in turn pivots pinion gear 3G in a clockwise motion around gear pivot pin 3H as indicated by arrow 63, thus driving the method teeth of opposing linear gear 3T in the direction indicated by arrow 64, thereby sliding eyepiece 3K in a synchronized manner away from eyepiece 3J, as indicated by arrow 65.

Figure 38:
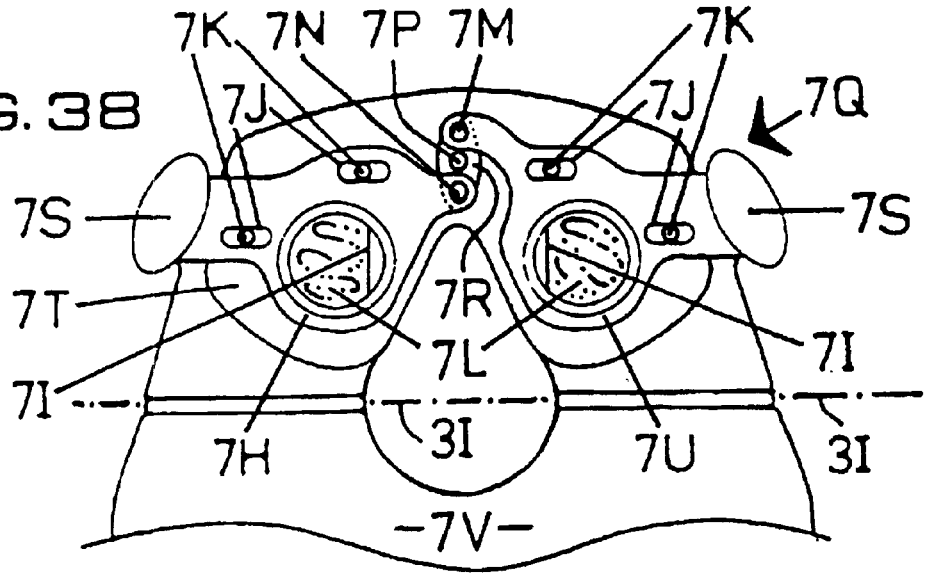
FIG. 38 is a front elevational view of viewer 7Q, which utilizes a fulcrum and pivotal arm to achieve synchronous lense and aperture adjustment movement in a manner similar to mechanism 5Q of FIGS. 33–35, except that the adjustment means of 7Q are interposed between the lenses and apertures.

FIG. 38 illustrates viewer 7Q and how fulcrum 7P and pivotal arm 7R may be positioned between the lenses 7L and occluding apertures 7I, the pivotal couplings 7N and 7M engaging corresponding means configured with lense carriages 7H and 7U, respectively. These pivotal couplings can be made in a number of techniques common to the mechanical art, nested plastic pins and sockets, rivets, etc. The tense carriages 7H and 7U may be integral with the lenses 7L and apertures 7I and may include adjustment switches 7S. The lense carriages are slidably positioned and limited in their movement by positioning aperture 7J, which slidably engage pins 7K; which are integral with base plate 7T, which also integrally includes living hinge 31 and insert plate 7V, shown in section. It is annotated that hinge 3I and plate 7V are shown as one of many possible ways to provide a corresponding means of engaging the viewer to the other components of the present invention, so that the pivotal function of the device as claimed may be achieved; however, the present invention should not be limited to these illustrated means. The advantage of locating the fulcrum and pivotal arm between the lenses is fairly straight forward; this enables adjustment switches 7S to be located on each side of the viewer so it may be adjusted with either hand while viewing.

Figure 39:
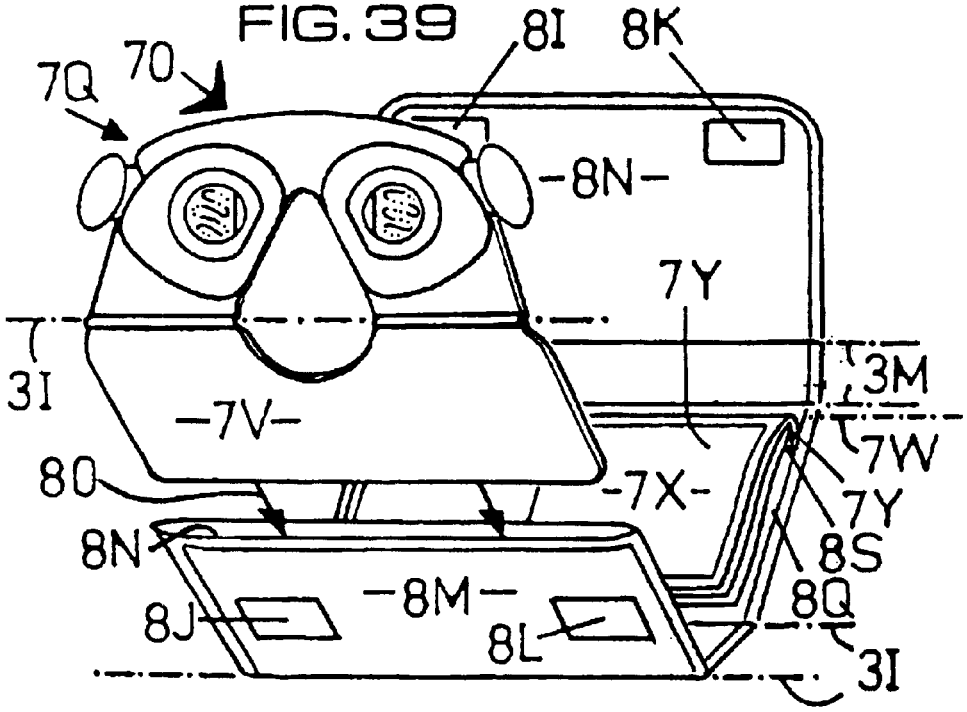
FIG. 39 is a perspective view of book 70, which portrays viewer 7Q being utilized to create a hybrid stereographic book with a reinforced fabric pivotal chassis and content support portion.

FIG. 39 depicts book 7O and how 7Q may be configured with insert plate 7V to engage, as indicated by the arrows 80, sleeve 8R of viewer pivotal chassis 8M, which is constructed of fabric with rigid plates sewn within so that the device can maintain its pivotal and support functions. It is understood that once insert plate 7V is slid into position, the viewer pivotal chassis geometry is rendered functional as claimed, and the axes designated as 3I pivot in the same manner as in previous figures.

The pivotal page support 8N, which includes two pivotal axes 3M, also functions as a cover flap and can be releasably secured to 8M with sewn velcro patches or other means common in the art, whereby patch 81 engages patch 8J and 8K engages 8L, respectively.

The content packet 7Y is shown in place, positioned, as shown in FIG. 1, by the packet sheet 7Z being slid into sleeve 8S on the content support portion 8Q, thus determining page pivotal axis 7W.

Stereographic content 7X is thereby positioned to be viewable as depicted in previous figures.

Figure 40:
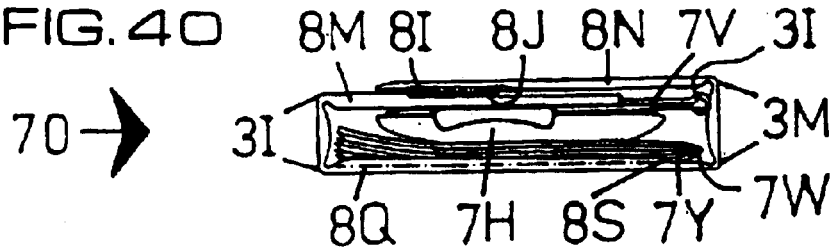
FIG. 40 is an end elevational view of the device of FIG. 39 in a storage configuration.

FIG. 40 is an end view of the present invention in a folded storage mode which reveals the components of the present invention.

Whereas the present invention is susceptible of various modifications and alternative constructions, the embodiments suggested in the drawings will herein be described in sufficient detail. It should be understood, however, it is not the intention to limit the invention to the particular forms disclosed, but to indicate the general spacial alignments and inherent geometries and thus define the functional and objective parameters of the present invention.

What is claimed is:

1. A stereographic device comprising:

a content support portion, a handheld stereoscopic viewer, and a viewer pivotal chassis;

the content support portion being configured to position and support textual, stereographic, and immersive content;

the content support portion being proportioned to convey, when said content support portion occupies a full field of view of the viewer when said viewer is at a position of focalization, content which is configured to convey four visual fields, including a left peripheral monocular field, a left binocular stereo field, a right binocular stereo field, and a right peripheral monocular field, respectively;

the viewer being configured to enable interocular adjustment, including adjustable left and right lenses and adjustable left and right occluding apertures configured to enable the right binocular stereo field and the right peripheral monocular field to be occluded from the left eye viewpoint and left binocular stereo field and the left peripheral monocular field to be occluded from the right eye viewpoint, respectively, the left and right occluding apertures being located in a common plane and being movable in the common plane to adjust the locations of the left and right occluding apertures;

said adjustable lenses and occluding apertures configured to facilitate interpupillary alignment with said content, to thereby enable fusion of the content of the left binocular stereo field with the content of the right binocular stereo field, to thus enable perception of a central binocular stereo field of three dimensional content, and with alignment of the respective occluding apertures, to also enable perception of the left and right peripheral monocular fields of two dimensional content, so that the full field of view, as perceived after fusion, consists of three fields of content including the left and right peripheral monocular fields of two dimensional content interposed by the central binocular stereo field of three dimensional content;

the viewer pivotal chassis being compatibly configured with said viewer and said content support portion to enable the viewer pivotal chassis to couple to said viewer and said content support portion so that the viewer pivotal chassis is interposed between said viewer and said content support portion;

the viewer pivotal chassis being configured to enable said viewer to be positioned in alignment with said content support portion and said content to facilitate perception of said content;

the viewer pivotal chassis including a plurality of pivotal axes parallel to a line which bisects the left and right lenses of said viewer, said axes being configured to enable a distance between said viewer and said content to be adjustable, so as to facilitate focalization; and said viewer pivotal chassis axes also being configured to enable said viewer to function and be movable in a plane that is parallel to a plane common to the surface of said content so that said content is visually scannable with said viewer by moving said viewer in said plane up and down a length of said content while maintaining focus during movement of the viewer relative to the content to facilitate focalized optical conveyance of content having an image area greater in its entirety than is optically accessible with the viewer at one time.

2. A variation of the content support portion of the device of claim 1, wherein said content support portion is configured to position and support a page axis to enable a plurality of pages to be pivotable, the page axis being parallel to the line which bisects the left and right lenses of the viewer, each of said pages having first and second opposite surfaces, each of said surfaces being pivotally positionable to convey said content optically with said viewer, so that two pivotally exposed page surfaces, which are adjacent to and opposite each other and disposed one on each side of said page axis, in an arrangement commonly known as two spread pages, are visually scannable with said viewer while maintaining focus.

3. A modification of the content support portion of the device of claim 2, wherein said content support portion is configured to provide a rigid, generally planar surface to position and support said page axis and said plurality of pages, to enable at least two pivotally exposed pages, which are adjacent to and opposite each other and disposed one on each side of said page axis, in an arrangement commonly known as two spread pages, to be supported in a generally common plane.

4. A modification of the content support portion of the device of claim 2, wherein said content support portion is configured to provide an articulated, pivotable page support surface, with at least one pivotable axis to thereby enable the device to be conformable into a compact size when in a storage configuration.

5. An adaptation of the plurality of pages of the device of claim 2, wherein each of said plurality of pages is configured as a transparent sleeve to enable at least two photographic stereographic pairs of said content to be placed back to back and slidably inserted into each sleeve; so that the first and second opposite surfaces of each page display the image-bearing surfaces of said photographic stereographic pairs to enable said photographic stereographic pairs to be optically conveyed with said viewer.

6. A modification of the device of claim 2, wherein said plurality of pages and said content support portion are configured to be compatible with each other to enable releasable attachment to each other.

7. A variation of the content support portion of the device of claim 1, wherein said content support portion is configured to provide a rigid, generally planar surface to position, support in a generally common plane and releasably attach at least one surface of a page provided with said content, to enable said content to be positioned to be optically conveyed and visually scanned with said viewer while maintaining focus.

8. A variation of the page of claim 7, wherein said page is configured as at least one transparent sleeve, to enable at least one photographic stereographic pair of said content to be slidably inserted into said sleeve so that said content is positioned to be conveyed optically and visually scanned with said viewer while maintaining focus.

9. A variation of the content support portion of the device of claim 1, wherein said content support portion is configured as a generally planar surface provided with said content, which is positioned to be optically conveyed and visually scanned with said viewer while maintaining focus.

10. A variation of said stereoscopic viewer of the device of claim 1, wherein said adjustable left and right lenses and respective occluding apertures are configured to enable independent adjustment relative to each other.

11. A variation of said stereoscopic viewer of claim 1, wherein said adjustable left and right lenses are integrally merged and molded in one piece with said left and right occluding apertures, respectively, so that adjustment of said left and right lenses determines a corresponding adjustment of said merged occluding apertures.

12. A variation of said stereoscopic viewer of claim 1, wherein said left and right lenses are merged with said respective occluding apertures and provided with a means of adjustment to enable synchronized equidistant movement towards and away from each other, and at least one slidable adjustment switch to facilitate rapid and precise interocular adjustment of said left and right lenses with said merged occluding apertures.

13. A variation of said viewer of claim 12, wherein said means of adjustment to enable synchronized equidistant movement is a pivotable arm provided with first and second pivotal ends and positioned by a fulcrum; said respective first and second ends of said arm being compatibly configured for coupling thereto said respective left and right lenses and said merged occluding apertures; a pivotal axis of said fulcrum and pivotal axes of said ends of said pivotal arm being perpendicular to a plane that is common to the left and right lenses.

14. A variation of said stereoscopic viewer of claim 12, wherein said means of adjustment to enable synchronized equidistant movement included a pinion gear meshed with first and second opposing linear gears, each of which slide therein a linear path parallel to the line which bisects the left and right lenses, said respective first and second linear gears being integrally merged and molded in one piece with said left and right lenses and said merged occluding apertures, a rotational axis of said pinion gear being perpendicular to a plane that is common to the left and right lenses.

15. A structural conformation of the device of claim 1, wherein said content support portion, said viewer, and said viewer pivotal chassis are pivotally conformable into a storage configuration that interposes the lenses of said viewer into a shielded position between said viewer pivotal chassis and said content support portion.

16. A modification of the structural conformation of claim 15, wherein said content support portion, said viewer and said viewer pivotal chassis are maintained in said storage configuration with releasable fasteners.

17. A stereographic device comprising:

a content support portion, a handheld stereographic viewer, and a viewer pivotal chassis;

the content support portion being configured to position and support textual, stereographic, and immersive content;

the content support portion being proportioned to convey, when said content support portion occupies a full field of view of the viewer when said viewer is at a position of focalization, content which is configured to convey four visual fields, including a left peripheral monocular field, a left binocular stereo field, a right binocular stereo field, and a right peripheral monocular field, respectively;

the viewer being configured to enable interocular adjustment, including adjustable left and right lenses and adjustable occluding apertures configured to enable the right binocular stereo field and the right peripheral monocular field to be occluded from the left eye viewpoint and left binocular stereo field and the left peripheral monocular field to be occluded from the right eye viewpoint, respectively;

said adjustable lenses and occluding apertures configured to facilitate interpupillary alignment with said content, to thereby enable fusion of the content of the left binocular stereo field with the content of the right binocular stereo field, to thus enable perception of a central binocular stereo field of three dimensional content, and with alignment of the respective occluding apertures, to also enable perception of the left and right peripheral monocular fields of two dimensional content, so that the full field of view, as perceived after fusion, consists of three fields of content including the left and right peripheral monocular fields of two dimensional content interposed by the central binocular stereo field of three dimensional content.

the viewer pivotal chassis being compatibly configured with said viewer and said content support portion to enable the viewer pivotal chassis to couple to said viewer and said content support portion so that the viewer pivotal chassis is interposed between said viewer and said content support portion;

the viewer pivotal chassis being configured to enable said viewer to be positioned in alignment with said content support portion and said content to facilitate perception of said content;

the viewer pivotal chassis including a plurality of pivotal axes parallel to a line which bisects the left and right lenses of said viewer, said axes being configured to enable a distance between said viewer and said content to be adjustable, so as to facilitate focalization; and said viewer pivotal chassis axes also being configured to enable said viewer to function and be movable in a plane that is parallel to a plane common to the surface of said content so that said content is visually scannable with said viewer by moving said viewer in said plane up and down a length of said content while maintaining focus, said content support portion being configured to position and support a page axis to enable a plurality of pages to be pivotable, the page axis being parallel to the line which bisects the left and right lenses of the viewer, each of said pages having first and second opposite surfaces, each of said surfaces being pivotally positionable to convey said content optically with said viewer, so that two pivotally exposed page surfaces, which are adjacent to and opposite each other and disposed one on each side of said page axis, in an arrangement commonly known as two spread pages, are visually scannable with said viewer while maintaining focus, and wherein said plurality of pivotable pages, each having first and second opposite surfaces provided with said content, are configured so that the upright direction of said content is oriented towards the pivotal axis of the pages and said pages and said content support portion are compatibly configured to be releasably attachable to each other; so that said upright content of said first surfaces is oriented, attached, positioned, pivoted and viewed sequentially with said viewer and then be released, reoriented, reattached, and repositioned to enable said upright content of said opposite second surfaces to be pivoted and thereby viewed sequentially with said viewer.

18. A stereographic device comprising:

a content support portion having stereographic content which includes a left peripheral monocular field, a left binocular stereo field, a right binocular stereo field, and a right peripheral monocular field;

a stereoscopic viewer including adjustable left and right lenses and left and right adjustable occluding apertures associated with the left and right lenses, respectively, the viewer being configured so that content of the left binocular stereo field is visually merged with content of the right binocular stereo field to enable perception of the fields of content including the left and right peripheral monocular fields of two dimensional content and a central binocular stereo field of three dimensional content located therebetween, the left and right occluding apertures each being located in a common plane and being movable in the common plane to adjust the locations of the left and right occluding apertures; and a viewer pivotal chassis configured to couple the viewer to the content support portion.

19. The apparatus of claim 18, wherein the adjustable left and right lenses and the respective left and right occluding apertures are configured to enable independent adjustment of the left and right lenses and left and right occluding apertures, respectively, relative to each other.

20. The apparatus of claim 18, wherein the viewer pivotal chassis is configured to enable said viewer to be positioned in alignment with said content support portion and said content to facilitate perception of said content, the viewer pivotal chassis being configured to enable a distance between said viewer and said content to be adjustable to facilitate focalization and configured to enable the viewer to be movable in a plane that is parallel to a plane of said content so that said content is visually scannable with said viewer by moving said viewer in said plane up and down a length of said content while maintaining focus.

21. A stereographic device comprising:

a content support portion having stereographic content which includes a left peripheral monocular field, a left binocular stereo field, a right binocular stereo field, and a right peripheral monocular field;

a stereoscopic viewer including adjustable left and right lenses and left and right adjustable occluding apertures associated with the left and right lenses, respectively, the viewer being configured so that content of the left binocular stereo field is visually merged with content of the right binocular stereo field to enable perception of three fields of content including the left and right peripheral monocular fields of two dimensional content and a central binocular stereo field of three dimensional content located therebetween, the adjustable left and right lenses being integrally formed with the left and right occluding apertures, respectively, so that adjustment of said left and right lenses causes a corresponding adjustment of the left and right occluding apertures respectively; and a viewer pivotal chassis configured to couple the viewer to the content support portion.

22. A stereographic device comprising:

a content support portion having stereographic content thereon;

a hard held stereoscopic viewer including left and right lenses to permit the content to be optically conveyed to enable perception of a binocular stereo field of three dimensional content; and a viewer pivotal chassis configured to couple the viewer to the content support portion, the viewer pivotal chassis including means for enabling a distance between the viewer and the content to be adjustable to permit focalization and for enabling the viewer to be movable in a first plane that is parallel to a second plane common to a surface of the content so that the content remains in focus during a scanning movement of the viewer in the first plane up and down a length of the content to facilitate optical conveyance of content having an image area greater in its entirety than is optically with the viewer at one time.

23. The device of claim 22, wherein the viewer includes adjustable left and right lenses.

24. The device of claim 23, wherein the viewer includes adjustable left and right occluding apertures associated with left and right lenses, respectively.

25. A stereographic device comprising:

a content support portion having stereographic content thereon;

a hand held stereographic viewer configured with left and right lenses to enable the content to be optically conveyed to facilitate perception of a binocular stereo field of three dimensional content; and a viewer pivotal chassis configured to couple the viewer to the content support portion, the content support portion being configured to position and support a plurality of pages which are pivotable about a page axis, the page axis being parallel to a line which bisects the left and right lenses, each of the plurality of pages having first and second opposite surfaces provided with content, with an upright direction of the content being oriented towards the page axis, the pages being configured to be releasably attached to the content support portion to enable the content on the first surfaces to be oriented, attached, positioned, pivoted and viewed in the upright direction sequentially with the viewer and then released, reoriented, reattached, and repositioned to enable the content on the second surfaces of the pages to be pivoted and thereby viewed sequentially in the upright direction with said viewer.

26. The device of claim 25, wherein the viewer includes adjustable left and right lenses.

27. The device of claim 26, wherein the viewer includes adjustable left and right occluding apertures associated with the left and right lenses, respectively.

*28. A stereographic viewing device comprising:*

*a stereoscopic viewer configured to enable interocular adjustment, including adjustable left and right viewpoint lenses and adjustable left and right viewpoint occluding apertures; respectively;*

*the lenses and apertures being configured for viewing immersive stereographic content having a format which presents the content in four visual fields, including a left peripheral monocular field, a left binocular stereo field, a right binocular stereo field, and a right peripheral monocular field, respectively, when the content is presented in a plane of focalization with the respective left eye and right eye viewpoints of the viewer;*

*the adjustable left and right lenses being configured to enable interpupillary alignment, stereoscopic fusion and perception of the content presented in the left and right binocular stereo fields as a central binocular stereo field of three dimensional content;*

*the adjustable left and right occluding apertures being configured to enable the right binocular stereo field and the right peripheral monocular field to be occluded from the left eye viewpoint and the left binocular stereo field and the left peripheral monocular field to be occluded from the right eye viewpoint, respectively; and*

*the adjustable left and right occluding apertures being movable in a common plane in close proximity to the user's eyes, to enable the occluding edges of the apertures to softly blur and optically blend the perception of the bordering edges of the fused central binocular field with the perception of the left and right peripheral monocular fields, so that the perception of the immersive stereographic content conveyed by the viewer includes a central binocular field of fused stereoscopic three dimensional content seamlessly blended with and interposed between left and right peripheral monocular fields of two dimensional content.*

*29. The device of claim 28, wherein the adjustable left and right lenses and respective occluding apertures are configured to enable independent adjustment relative to each other.*

*30. The device of claim 28, wherein the adjustable left and right lenses integral with the respective left and right occluding apertures so that adjustment of the lenses also determines adjustment of the occluding apertures.*

*31. The device of claim 30, wherein the function of adjustment is characterized by synchronized equidistant movement of the left lens and integral occluding aperture toward and away from the right lens and integral occluding aperture.*

*32. The device of claim 31, wherein the function of adjustment is enabled with a pivotal arm positioned by a fulcrum with one end of the pivotal arm pivotally attached to the left lens and integral occluding aperture, and the other end of the pivotal arm pivotally attached to the right lens and integral occluding aperture; the axis of the fulcrum and the axes of the pivotal ends of the pivotal arm being generally perpendicular to a plane common to the left and right lenses.*

*33. The device of claim 31, wherein the function of adjustment is enabled by rotational movement of a pinion gear meshed with two opposing linear gears, each of which slide on a line parallel to a line which bisects the left and right lenses, one of the linear gears being attached to the left lens and integral occluding aperture, the other linear gear being attached to the right lens and integral occluding aperture; the axis of the pinion gear being generally perpendicular to a plane common to the left and right lenses.*

*34. The device of claim 28, wherein the viewer is configured as a hybrid stereographic book having a content support portion and a chassis that releasably attaches to the viewer so that the viewer is separable from the chassis and the content support portion; the content support portion being configured to support a multiple paged content packet having an axis to enable a plurality of pages to be pivotable, the page axis being parallel to a line which bisects the left and right lenses, the pages having immersive stereographic content thereon; the content support portion and chassis being configured to enable the viewer to be maintained in alignment with the content during viewing and pivoting of multiple pages of content.*

*35. The device of claim 34, wherein the plurality of pivotable pages, each having first and second opposite surfaces provided with stereographic content, the upright direction of the content oriented towards the pivotal axis of the pages; the axis and pages being configured for releasable attachment to the content support portion, so that the upright content of the first surfaces can be oriented, positioned, viewed with the viewer, released, reoriented, and repositioned to enable the upright content of the second opposite surfaces to be viewable with the viewer.*

* * * * *